(12) United States Patent
Davis et al.

(10) Patent No.: US 12,410,020 B2
(45) Date of Patent: Sep. 9, 2025

(54) SYSTEMS AND METHODS FOR INSTALLATION OF SOLAR PANEL ASSEMBLIES

(71) Applicant: Gridworks Technology, LLC, Scottsdale, AZ (US)

(72) Inventors: John M. Davis, Scottsdale, AZ (US); David Garrett, Laveen, AZ (US)

(73) Assignee: GRIDWORKS TECHNOLOGY, LLC, Scottsdale, AZ (US)

( * ) Notice: Subject to any disclaimer, the term of this patent is extended or adjusted under 35 U.S.C. 154(b) by 140 days.

(21) Appl. No.: 18/114,902

(22) Filed: Feb. 27, 2023

(65) Prior Publication Data

US 2024/0083699 A1   Mar. 14, 2024

Related U.S. Application Data

(63) Continuation of application No. PCT/US2022/043547, filed on Sep. 14, 2022.

(51) Int. Cl.
*B65G 67/02* (2006.01)
*B60P 1/54* (2006.01)
*B60P 3/00* (2006.01)

(52) U.S. Cl.
CPC ............ *B65G 67/02* (2013.01); *B60P 1/5409* (2013.01); *B60P 3/00* (2013.01)

(58) Field of Classification Search
CPC .......... H02S 20/10; H02S 20/21; H02S 20/30; H02S 10/00; H02S 10/40; H02S 30/00; H02S 30/20; B60P 3/002; B60P 3/00; B60P 7/135; B60P 7/10; B60P 1/5409; F24S 25/12; F24S 25/10; F24S 2025/014; B65G 67/02; B65G 1/14

USPC .......................................................... 414/467
See application file for complete search history.

(56) References Cited

U.S. PATENT DOCUMENTS

| | | | | |
|---|---|---|---|---|
| 2,962,250 | A | * | 11/1960 | Carey .................... B65D 85/68 206/386 |
| 4,826,360 | A | * | 5/1989 | Iwasawa ............. H01L 21/6773 414/217 |
| 6,135,674 | A | | 10/2000 | Neilson |
| 6,397,063 | B1 | * | 5/2002 | Sessions ................ H04B 17/27 455/67.14 |
| 6,591,919 | B1 | | 7/2003 | Hermann |
| 7,004,262 | B1 | | 2/2006 | Voichoskie et al. |
| 9,287,822 | B2 | | 3/2016 | Levi et al. |

(Continued)

FOREIGN PATENT DOCUMENTS

EP   1622192 A1   2/2006

OTHER PUBLICATIONS

International Search Report and Written Opinion from corresponding PCT Application No. PCT/US22/43547 Feb. 7, 2023.

(Continued)

*Primary Examiner* — Glenn F Myers
(74) *Attorney, Agent, or Firm* — BRYAN CAVE LEIGHTON PAISNER LLP

(57) ABSTRACT

A method including loading solar panel assemblies onto a vehicle, transporting the solar panel assemblies on the vehicle to a pile row of a solar project installation site, and individually unloading the solar panel assemblies along the pile row at the installation site to facilitate installation of the solar panel assemblies on the pile row. Other embodiments are described.

32 Claims, 30 Drawing Sheets

(56) References Cited

U.S. PATENT DOCUMENTS

| | | |
|---|---|---|
| 10,584,901 B2 | 3/2020 | Potter |
| 10,633,887 B1 | 4/2020 | Fisher et al. |
| 2003/0205421 A1* | 11/2003 | Allen ........................ B60L 3/04 |
| | | 180/65.1 |
| 2009/0032089 A1* | 2/2009 | Chen ....................... H02S 20/24 |
| | | 136/246 |
| 2011/0233157 A1* | 9/2011 | Kmita ..................... H02S 20/24 |
| | | 211/41.1 |
| 2012/0163937 A1 | 6/2012 | Zemaitatis |
| 2013/0142576 A1 | 6/2013 | Kocher |
| 2014/0182936 A1 | 7/2014 | Matlewski et al. |
| 2016/0298355 A1 | 10/2016 | Carlos De Alvarenga et al. |
| 2016/0344330 A1 | 11/2016 | Gillis |
| 2019/0145113 A1* | 5/2019 | Nguyen ................ E04G 21/168 |
| | | 414/11 |
| 2019/0234037 A1 | 8/2019 | Canteri |
| 2020/0280280 A1* | 9/2020 | Schelhaas ............... H02S 40/38 |
| 2021/0304125 A1* | 9/2021 | Sheesley ............. B65D 21/086 |
| 2022/0256779 A1* | 8/2022 | Haastert ................... H02S 20/30 |
| 2024/0030863 A1* | 1/2024 | Brulo ....................... F24S 80/00 |

OTHER PUBLICATIONS

International Search Report and Written Opinion from corresponding PCT Application No. PCT/US22/43554 Feb. 7, 2023.

* cited by examiner

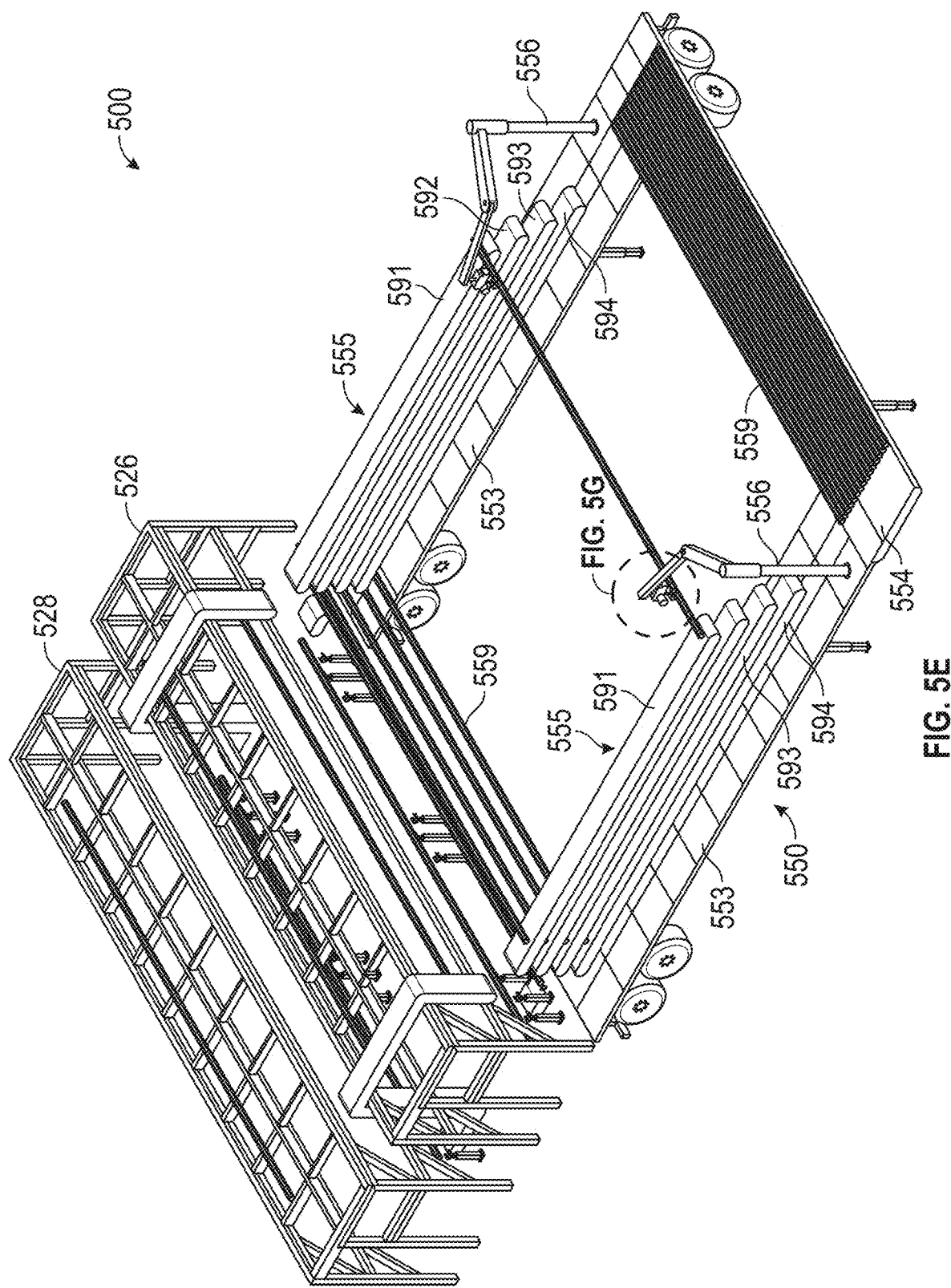

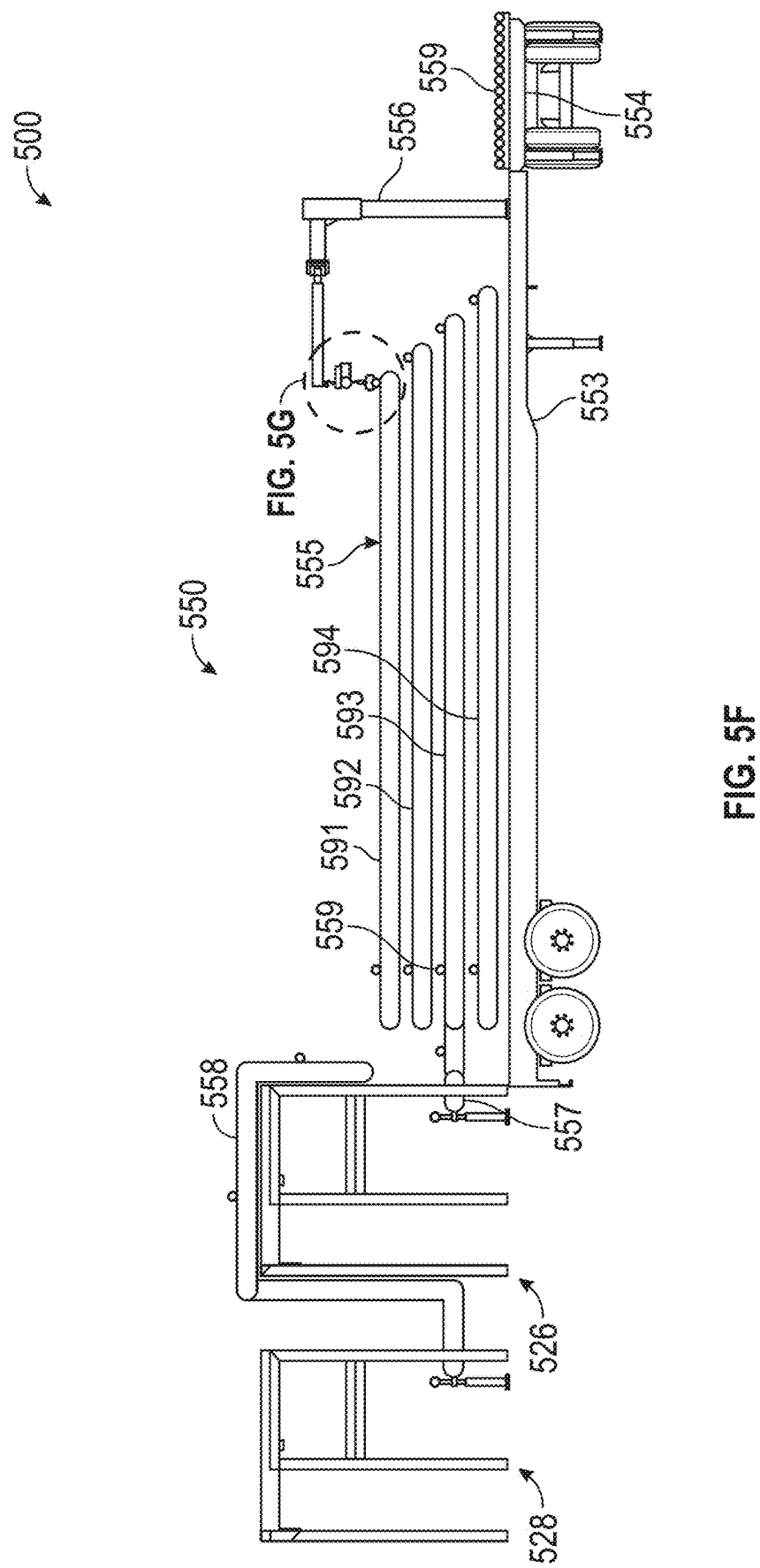

SYSTEMS AND METHODS FOR INSTALLATION OF SOLAR PANEL ASSEMBLIES

CROSS-REFERENCE TO RELATED APPLICATION

This application is a continuation of PCT Application No. PCT/US2022/043547, filed Sep. 14, 2022. The content of the above-identified application is incorporated by reference herein in its entirety.

TECHNICAL FIELD

The present disclosure is directed to systems and methods for installation of solar panel assemblies.

BACKGROUND

Solar panels are often used as alternative energy resources. Typically, a large number of solar panels are used in a solar project to maintain sufficient energy supply scale to be suitable for an electric utility. However, installation of solar panels is a labor intensive process that involves significant labor and equipment costs, and takes a significant amount of time to properly install to ensure the solar panels operate efficiently in a durable configuration for the contracted life-cycle of the solar project.

BRIEF DESCRIPTION OF DRAWINGS

To facilitate further description of the embodiments, the following drawings are provided, in which like references are intended to refer to like or corresponding parts, and in which:

FIG. 5E illustrates a top perspective view of a third portion of the mobile solar panel assembly facility of FIG. 5A;

FIG. 5F illustrates a side elevational view of the third portion of the mobile solar panel assembly facility of FIG. 5A;

Figure 1:
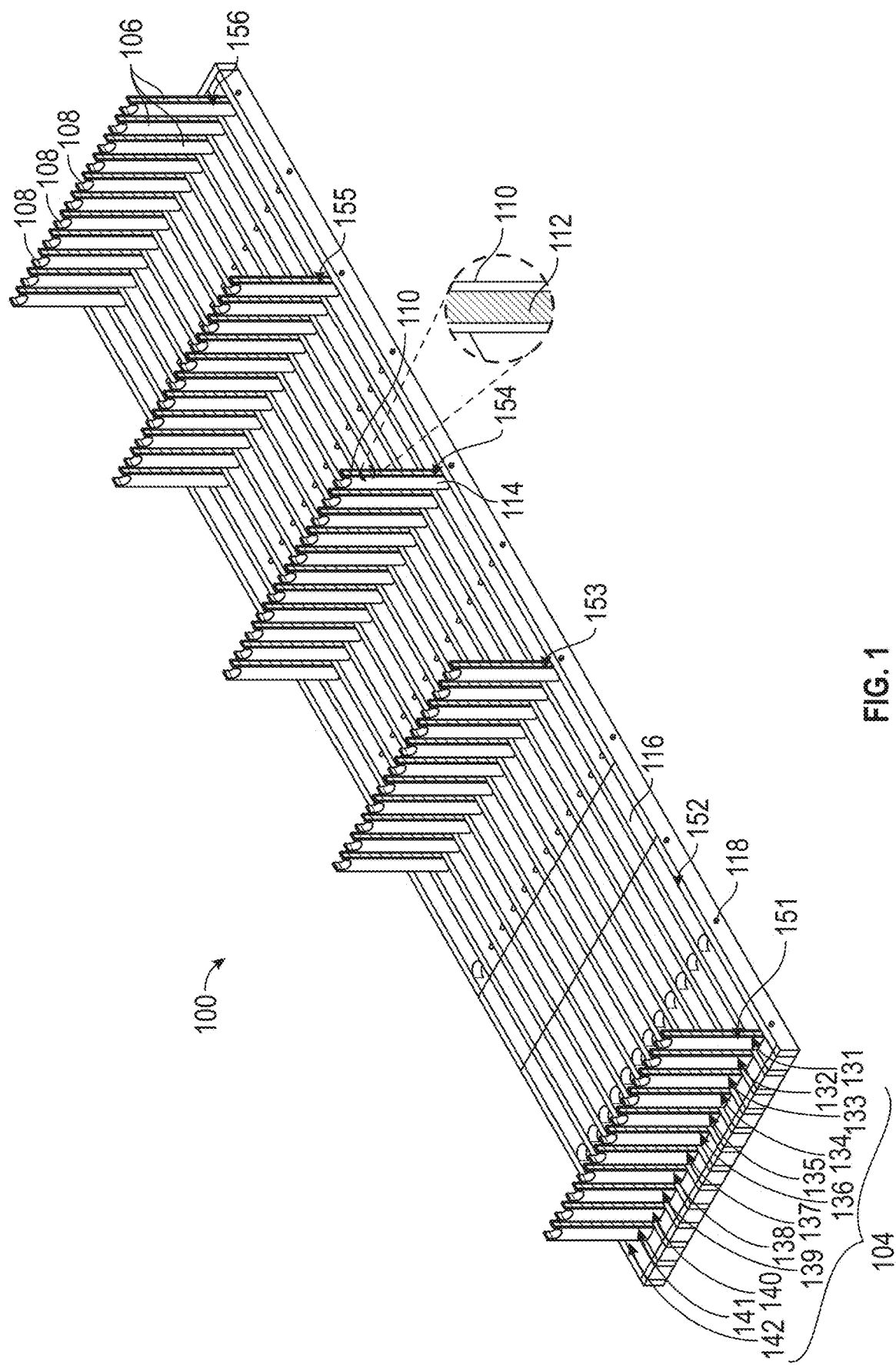
FIG. 1 illustrates a top perspective view of an exemplary cassette that is empty (not holding solar panels assemblies), according to certain embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

The present disclosure relates to systems and methods for installation of photovoltaic (PV) solar panels. Conventional approaches for utility-scale installation of solar panels at solar projects (e.g., 5 megawatts (MW) to 500 MW or more) typically involve single-axis tracker systems that sit on a structural shape piling system. The tracker systems generally include a torque tube, brackets that affix the torque tube to the module frames, bushings that affix to the pile caps, and the wire harness assembly that daisy chains output of the module rows. In conventional approaches, each of these components is pre-staged by teams on vehicles (trucks) at intervals in the field and subsequently hand assembled. Installing the system on existing piles involves a minimum of four steps, including tracker installation, alignment, module installation on the tracker system, and finally installation of the wire harnesses. There are other support tasks like garbage cleanup, pallet pickup, and an array of work assist equipment like forklifts, in addition to dealing with material shortages or damage that slows progress of the installation.

Difficulties with these conventional approaches include that the work is manual, which presents problems and costs for labor acquisition, retention, training, and consistency of product quality. These factors can affect project cost and risk for a contractor, especially related to end-dates. This risk is generally priced into a contractor offering, absent a better way to manage these factors, but constrains any effort to compress installation costs of utility scale solar thereby limiting solar installed cost compression which is desirable for sustainability as a long-term power alternative.

Embodiments disclosed herein can include the ability to improve cycle time and quality because the process is repeatable and far less dependent on impromptu team performance of varied work crews. Embodiments disclosed herein can reduce turnover and improve efficiency of the aggregate workforce associated with the installation of solar panel assemblies. In particular, the four (or more) serial field activities that exist with the conventional methods can become a single installation activity, with elimination of the field prestaging and material handling. Assemblies can be fabricated in precision repeatable jig and wire harnesses installed to repeatable visual indications making all assemblies consistent. The complete assembly can be loaded onto a cassette, and handled as a unit. In addition, cycle time per assembly can be faster and consistent using the embodiments disclosed herein. These embodiments can allow improvement to be made to quality and predictability to production end-dates, which are not easily achieved with the conventional methods.

Overall, embodiments disclosed herein can improve the labor-intensive nature of solar installation, reduce installation costs, and/or improve efficiencies associated with the assembly and installation of solar panels. Embodiments disclosed herein can involve assembly of solar panel assemblies at a mobile facility in the field at a solar project installation site, with internal transport and installation of the solar panel assemblies within the solar project installation site at various locations along pile roles within the solar project installation site. These embodiments can provide a vast improvement over conventional systems and methods which involve a plurality of steps and coordination among various parties to assemble and install the tracker systems in the field. Accordingly, embodiments disclosed herein can improve on conventional systems by reducing the time involved to install a solar panel assembly, reduce labor, and/or provide consistency to installation of solar panel assemblies.

Figure 3:
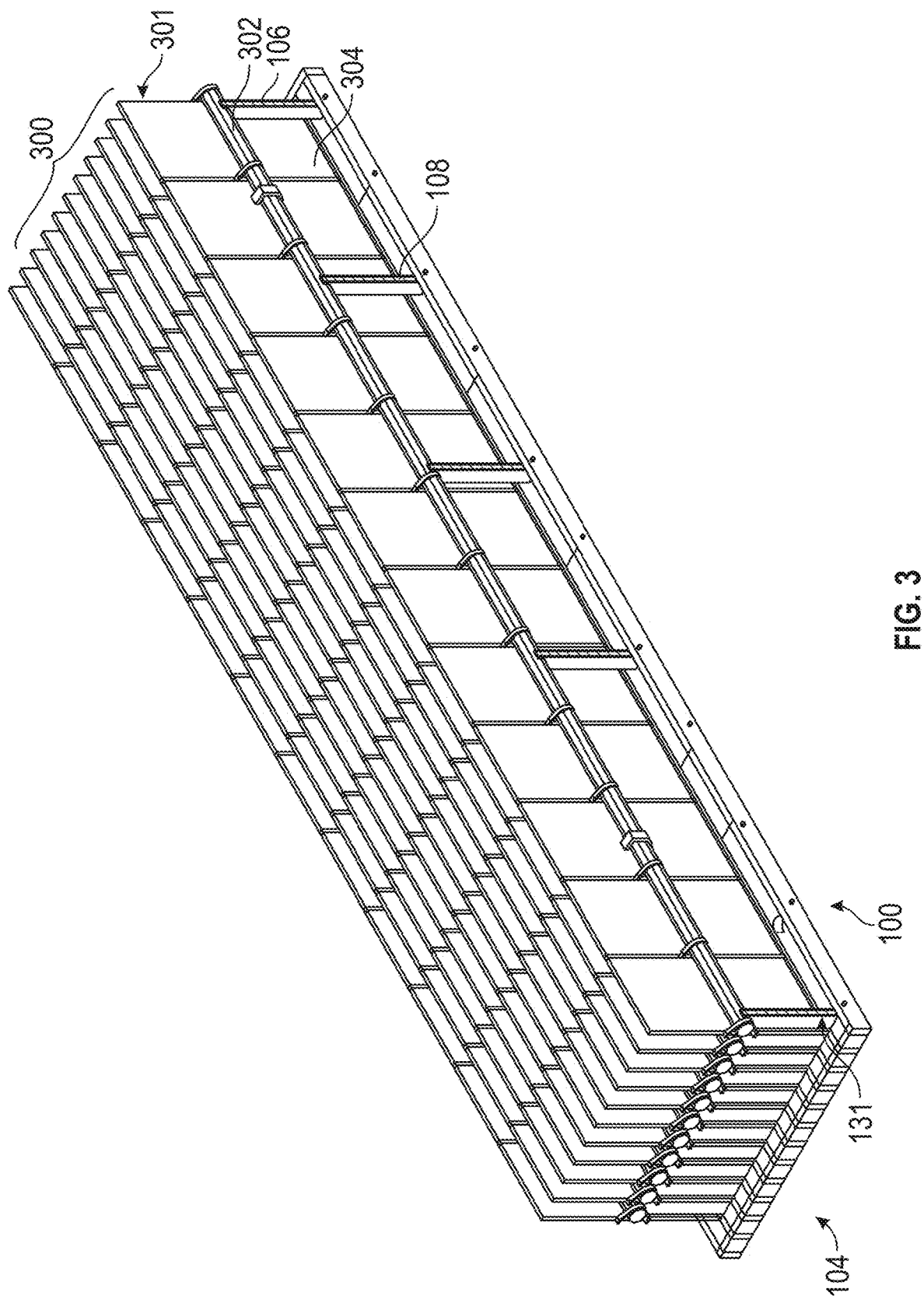
FIG. 3 illustrates a top perspective view of the cassette of FIG. 1 filled with solar panel assemblies.

Turning to the figures, FIG. 1 illustrates a top perspective view of a cassette 100 that is empty (not holding solar panel assemblies, e.g., solar panel assemblies 300 in FIG. 3), according to certain embodiments. The cassette 100 is merely exemplary, and embodiments of the cassette are not limited to the embodiment shown and presented herein. The cassette can be employed in many different embodiments or examples not specifically depicted or described herein. The cassette 100 of the illustrated example includes a base 102 and stanchion rows 104. In some embodiments, a quantity of the stanchion rows 104 is at least eight. For example, as shown in FIG. 1, the cassette 100 can include twelve stanchion rows, namely stanchion rows 131-142. The stanchion rows 104 can each extend lengthwise along the cassette 100. The stanchion rows 104 can be configured to hold solar panel assemblies (e.g., solar panel assemblies 300 in FIG. 3). In some embodiments, each of the stanchion rows 104 is configured to hold a torque tube of a solar panel assembly.

In the illustrated embodiment, each of the stanchion rows 104 can include stanchions 106. In many embodiments, the stanchions 106 can be positioned in the cassette across the stanchion rows 104 in columns, such as columns 151-156. In some embodiments, a quantity of the stanchions 106 within each of the stanchion rows 104 is at least three, to support the solar panel assembly at the ends and in at least one spot between the ends to limit the solar panel assembly from flexing along the torque tube, as the length of the solar panel assembly in some embodiments can be approximately 40 feet (12.19 meters (m)). For example, as shown in FIG. 1, stanchion row 131 can include six stanchions, one at each of columns 151-156. As depicted in FIG. 1, the stanchions 106 in stanchion rows 131-141 in columns 151 and 153-156 are in upright positions, and the stanchions 106 in column 152 and the stanchions 106 in stanchion row 142 are in lowered positions. In some embodiments, each of the stanchions 106 of each of the stanchion rows 104 can include a saddle 108 configured to receive the torque tube of the solar panel assembly held by the stanchion row 104. In some embodiments, the saddle 108 is positioned external to the tube 110.

In some embodiments, the saddle 108 is adjustable with respect to the stanchion 106 for one or more of the stanchions with each of the stanchion rows 104. For example, in the illustrated embodiment, each of the stanchions 106 can include a tube 110 and a rod 112 positioned in the tube 110. In some embodiments, the saddle 108 of the stanchion 106 is coupled to the rod 112. In the illustrated embodiment, the rod 112 is coupled to an actuator 114 on the base 102. In some embodiments, the actuator 114 can operate the rod 112 to extend the saddle 108 away from respective tube 110 and raise the position of saddle 108 above base 102, thereby lifting, or supporting at a higher position, a torque tube of the corresponding solar panel assembly. In some embodiments, the actuator 114 can be operated by a foot of a worker to adjust the vertical position of the saddle 108. In some embodiments, the rod 112 can be supported by a spring, such that the spring can bias the rod 112 and, thus, the saddle 108 outward from the tube 110.

In some embodiments, the base 102 can include one or more recesses 116 corresponding to each of the stanchion rows 104. In some embodiments, the recesses 116 are configured to receive a portion (e.g., a bottom portion) of one or more solar panels of the respective solar panel assembly that are held by the stanchion rows 104 when the torque tube of the solar panel assembly is positioned in the saddles 108 of the stanchions 106 of the stanchion rows 104.

In some embodiments, the base 102 can include one or more apertures 118 configured to receive one or more tools or conveyors of a work vehicle. For example, the apertures 118 can receive a tool of a work vehicle to maneuver the cassette 100 from one location to another.

In some embodiments, the solar panel assemblies held by the stanchion rows 104 in the cassette 100 are configured to be installed in a solar project and extend across a full block row of a solar project. A full block row generally can have a variable number of solar panel assemblies, typically between six and twelve (e.g., twelve torque tubes, with the associated solar panels affixed to each of the torque tubes) and an aggregate of approximately 144 solar panels, though block rows usually have approximately 100 solar panels. For example, in some embodiments, the solar panel assemblies configured to be held by the stanchion rows 104 each can include up to twelve solar panels.

Figure 6:
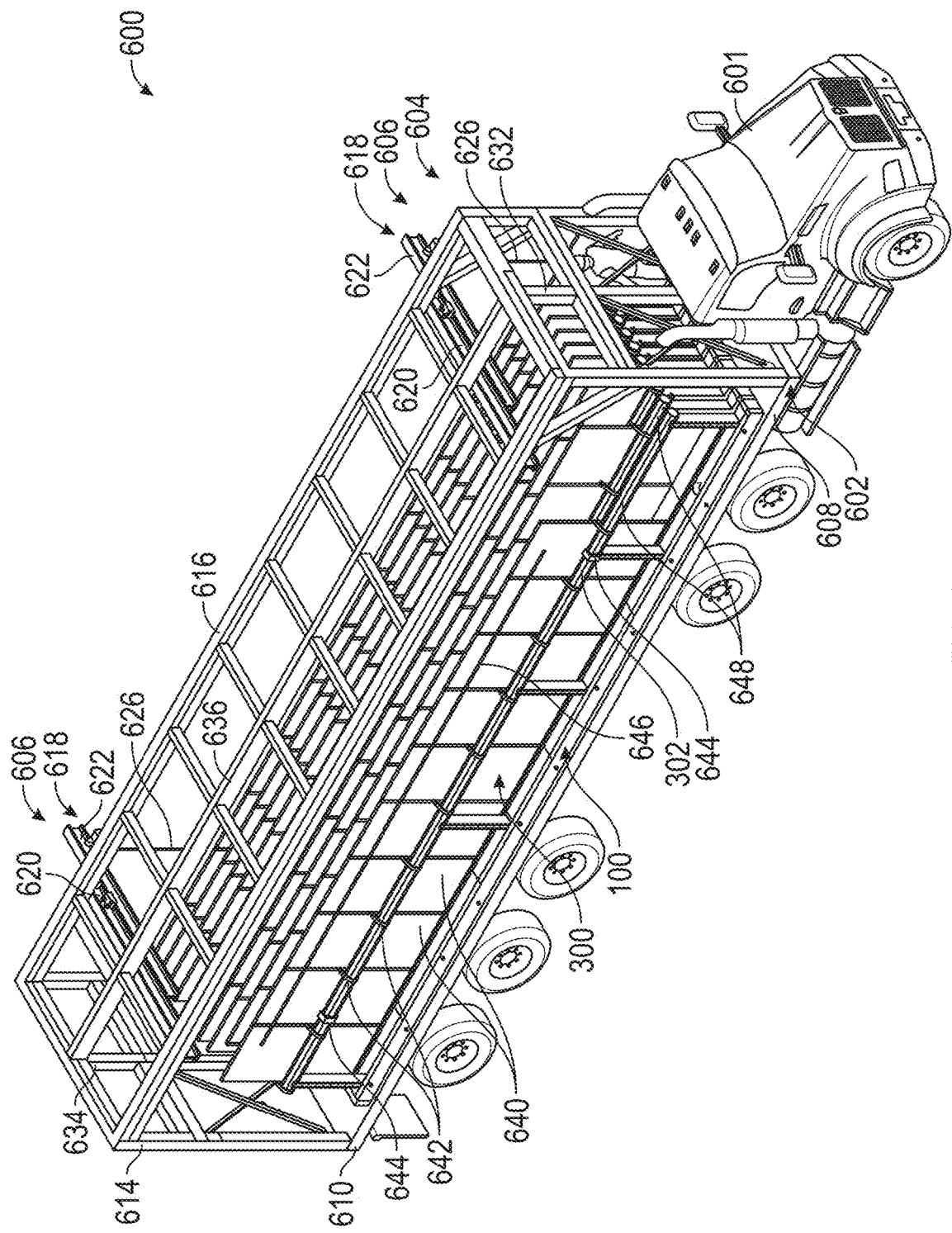
FIG. 6 illustrates a top, front, passenger-side perspective view an exemplary solar panel assembly installation vehicle, according to certain embodiments.
Figure 9:
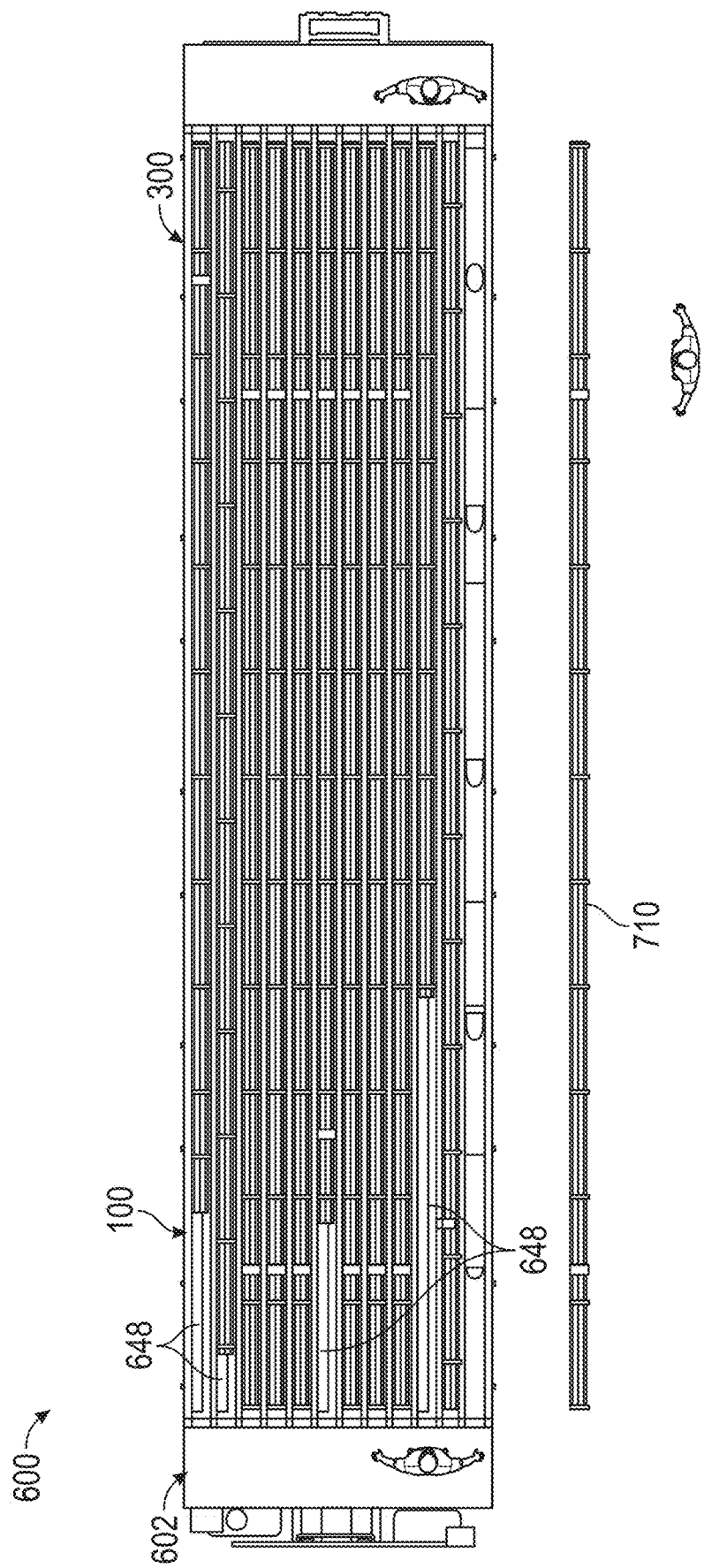
FIG. 9 illustrates a top plan view of the solar panel assembly installation vehicle of FIG. 6.

In some embodiments, the stanchion rows 104 are configured to hold the solar panel assemblies when the lengths of torque tubes of the solar panel assemblies are different and when the lengths of the torque tubes are the same. For example, the torque tubes can be of variable length, depending on specifications for installation of the solar panel assemblies at particular locations of the solar project. In some cases, a solar panel assembly can contain between five and twelve solar panels and the torque tube of the solar panel assembly can extend merely halfway from a first end of the base 102 to a center point of the base 102. Accordingly, a portion of the stanchions 106 can receive the torque tube, while other stanchions 106 in another stanchion row 104 can hold a solar panel assembly with 12 solar panels and a torque tube that across the length of the base 102 from column 151 to column 156, for example. In some embodiments, an extender rod (e.g., 648, as shown in FIGS. 6 and 9) can be used to span the rest of the stanchion row 104 if the torque tube does not extend across the entire stanchion row. The extender rod can be used to provide uniform overall length of the solar panel assembly while the solar panel assembly is being loaded onto the cassette, while the solar panel assembly is being held within the cassette, and/or while the solar panel assembly is being removed from the cassette.

In some embodiments, one or more of the stanchions 106 of each of the stanchion rows 104 can be configured to rotate back-and-forth between an upright position (e.g., the positions of the stanchions 106 in column 152) and a lowered position (e.g., the positions of the stanchions in columns 151 and 153-156). In some embodiments, the stanchions 106 can be spring-biased in the upright position, such that the stanchion 106 can rotate from the lowered position to the upright position when a worker releases a hook or latch (not shown) that is holding the stanchion 106 in the lowered position. When the worker desires certain stanchions 106 to be lowered, such as when the solar panel assembly has been removed from the stanchions 106 of a certain stanchion row 104, the worker can rotate the stanchions 106 from the upright position to the lowered position.

Figure 2:
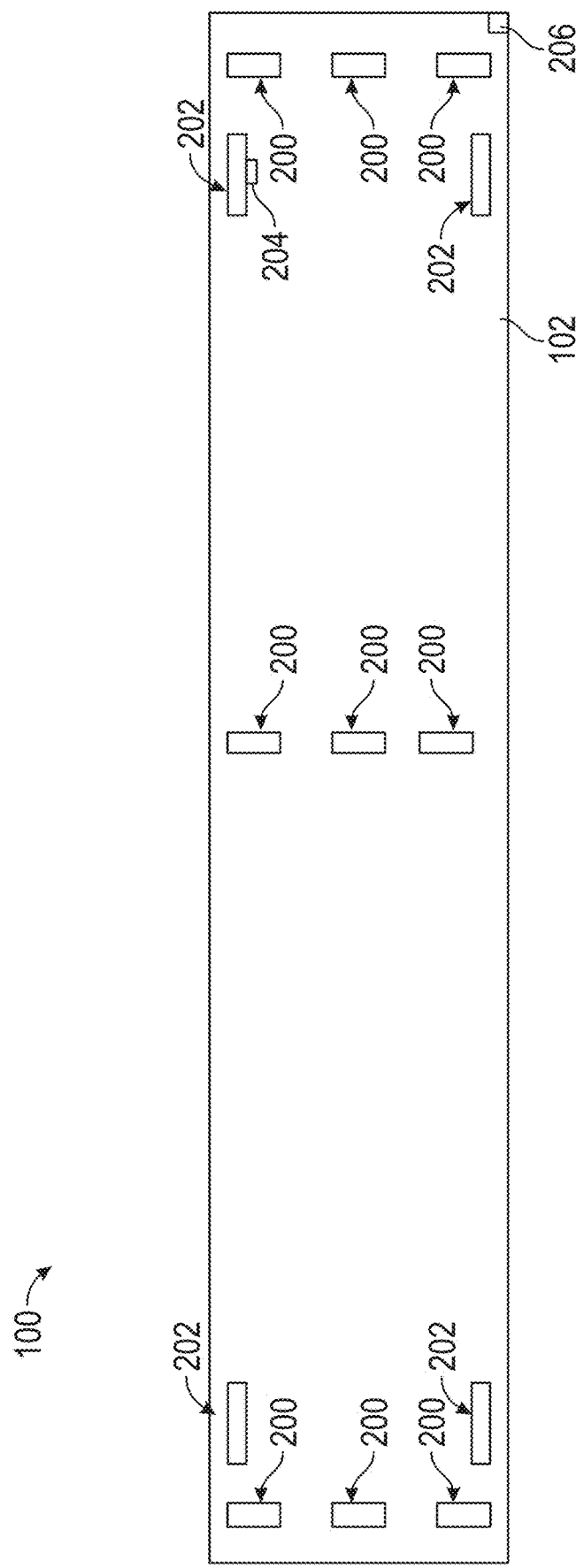
FIG. 2 illustrates a bottom view of the cassette of FIG. 1, where the cassette is internally driven.

Turning ahead in the drawings, FIG. 2 illustrates a bottom view of the cassette 100. In some embodiments, the base 102 can include a drive system including a first set of wheels 200 and a second set of wheels 202. In the illustrated embodiment, the first set of wheels 200 is positioned in a first direction, and the second set of wheels 202 is positioned in a second direction different from the first direction. For example, as shown in FIG. 2, the first set of wheels 200 can be oriented to move the cassette 100 in a widthwise direction, and the second set of wheels 202 can be oriented to move the cassette 100 in a lengthwise direction. In some embodiments, the drive system of base 102 can include drive motors (e.g., 204) configured to drive the first set of wheels 200 and/or the second sets of wheels 202. In some embodiments, the base 102 can include a battery 206 configured to power the drive motors 204. The drive system can be used to move the cassette 100. In other embodiments, the cassette 100 does not include a drive system, and various conveyors can be used to move the cassette 100.

Figure 4:
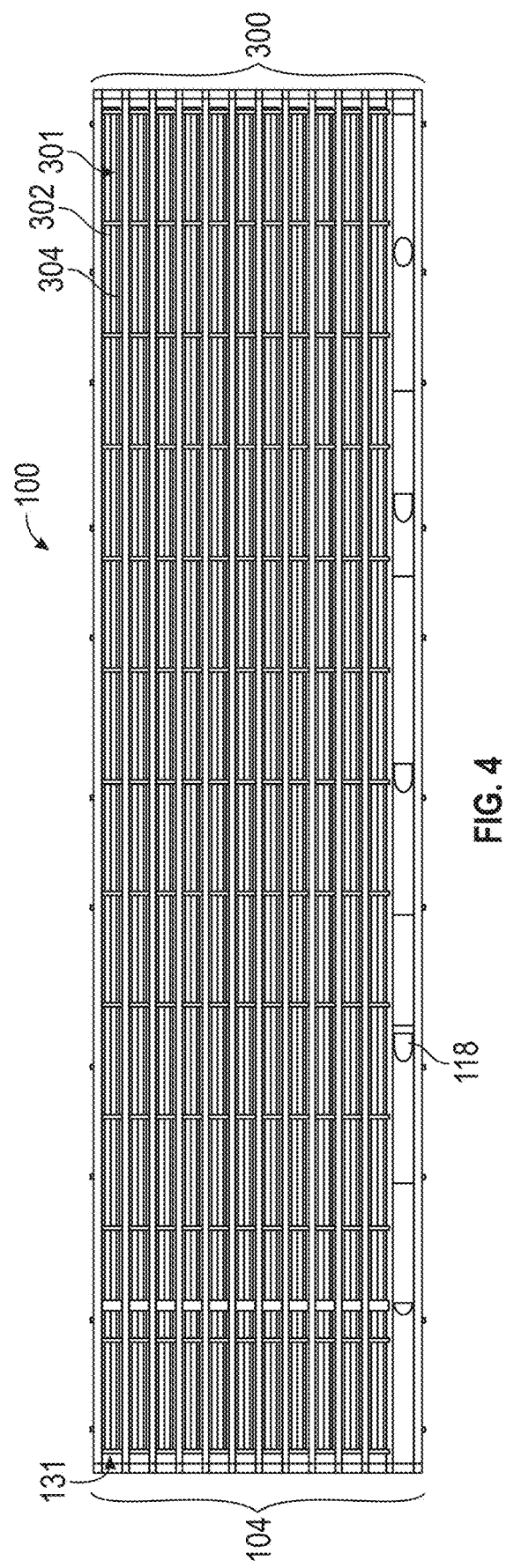
FIG. 4 illustrates a top view of the cassette of FIG. 1 filled with solar panel assemblies.

Turning ahead in the drawings, FIG. 3 illustrates the cassette 100 filled with solar panel assemblies 300, such as solar panel assembly 301. FIG. 4 illustrates a top view of the cassette 100 filled with the solar panel assemblies 300. The stanchion rows 104 can each hold a separate solar panel assembly (e.g., 301). As shown in FIGS. 3-4, the cassette 100 can hold twelve solar panel assemblies (e.g., 300). In the illustrated embodiment, the solar panel assemblies 300 include torque tubes, such as a torque tube 302 of solar panel assembly 301. In the illustrated embodiment, the torque tubes (e.g., 302) are positioned in saddles 108 of stanchions 106 within each of the stanchion rows 104. For example, as shown in FIG. 3, torque tube 302 of solar panel assembly 301 is seated within saddles 108 of stanchions 106 along stanchion row 131.

As described in more detail below, solar panels, such as solar panel 304, can be affixed to torque tube 302 of solar panel assembly 301. In the embodiment shown, each of the solar panel assemblies 300 includes twelve solar panels, such that the cassette 100 collectively holds 144 solar panels. Other configurations of solar panel assemblies with different numbers of solar panels (and even varying numbers of solar panels across stanchion rows 104) can be held by the cassette 100. As shown in FIGS. 3-4, when the solar panel assemblies 300 are held by the cassette 100, the solar panels within the solar panel assemblies can be positioned in a substantially vertical position. In many cases, each of the solar panels is at approximately 78 inches (2 m) long (e.g., tall in the upright position) and approximately 39 inches (1 m) wide. As assembled, each of the solar panels assemblies can weigh approximately 1,200 pounds (544.3 kilograms (kg)).

Figure 5A:
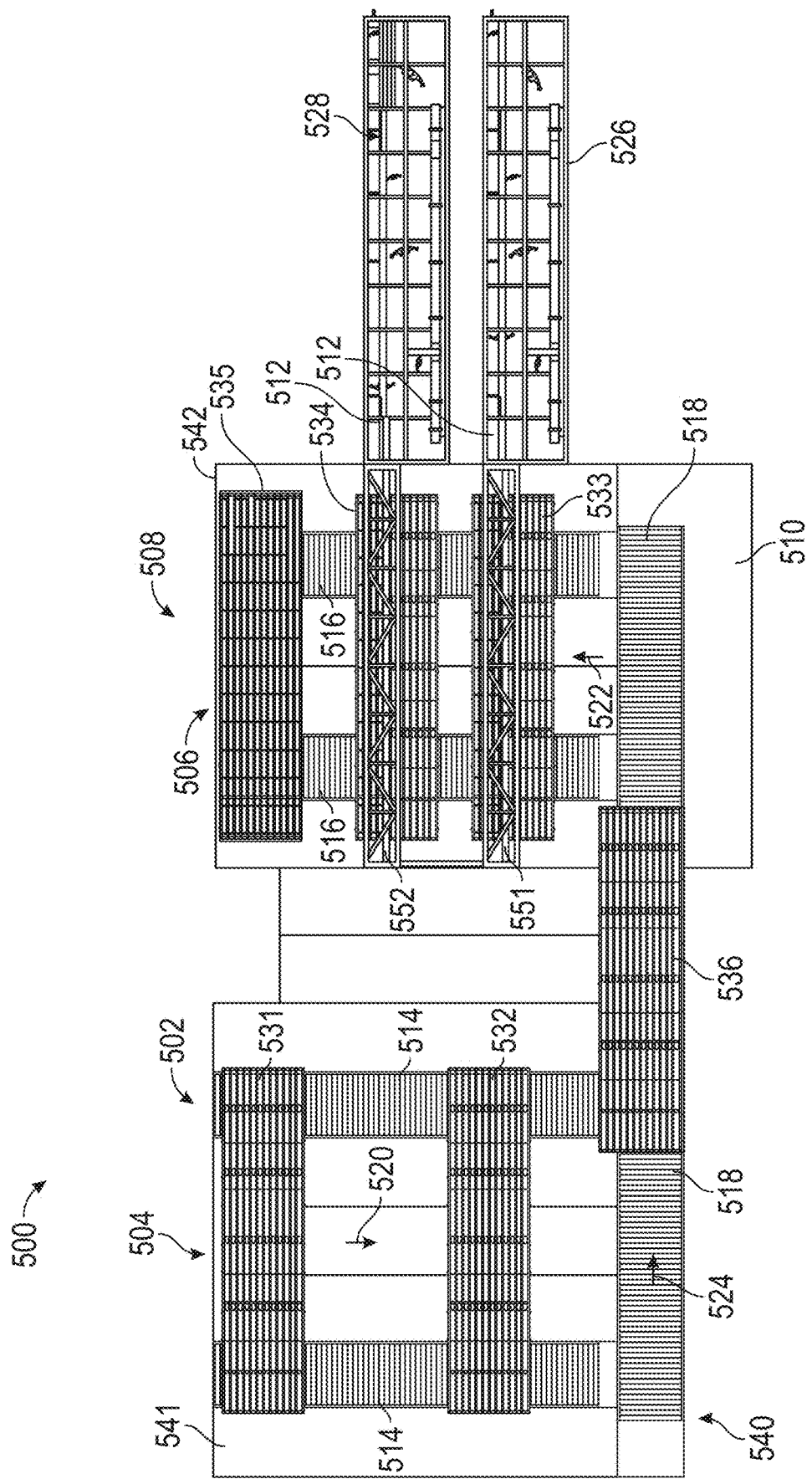
FIG. 5A illustrates a top plan view of an exemplary mobile solar panel assembly facility, according to certain embodiments.
Figure 5B:
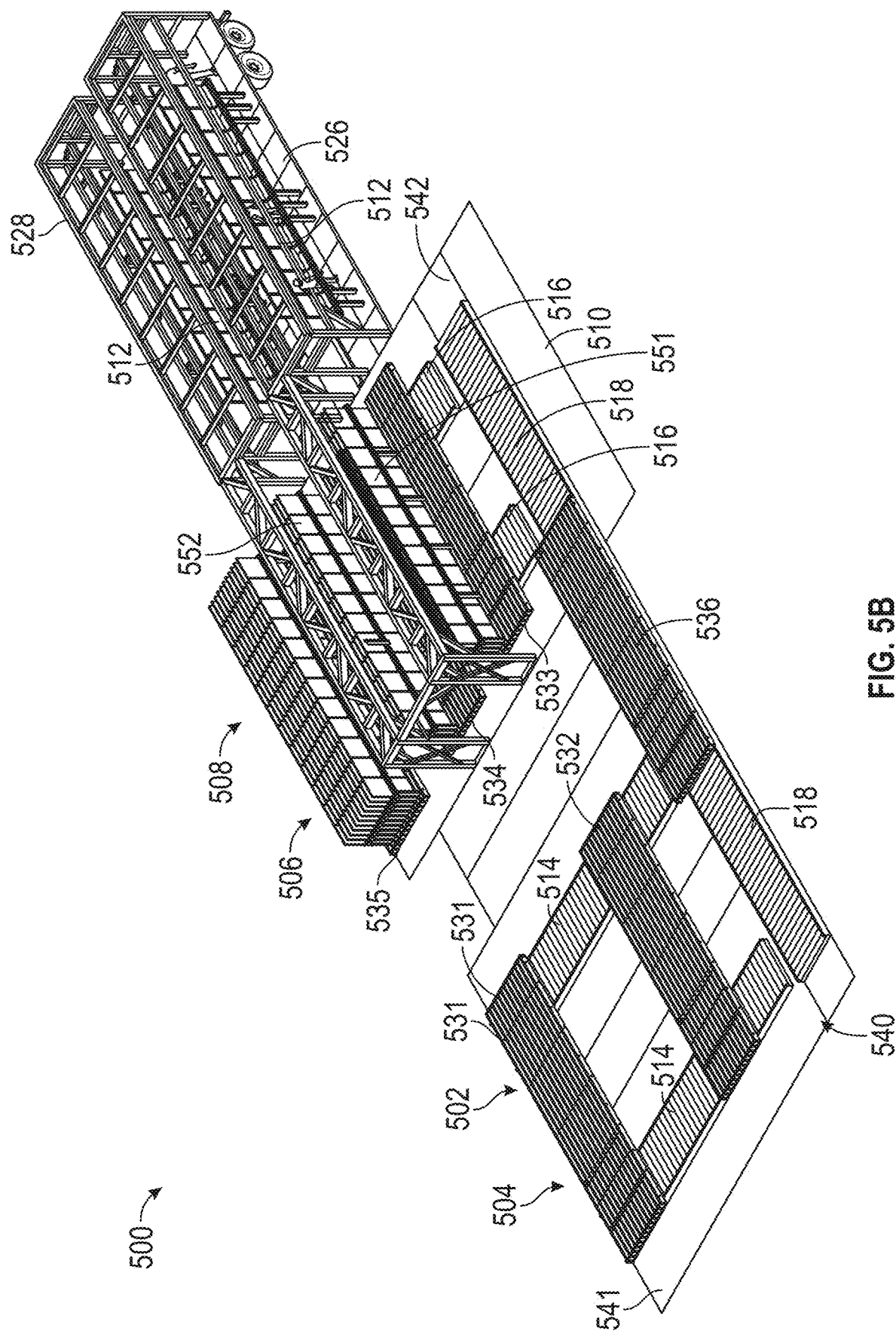
FIG. 5B illustrates a top perspective view of the first portion of the mobile solar panel assembly facility of FIG. 5A.

Turning ahead in the drawings, FIG. 5A illustrates a top plan view of a first portion of an exemplary mobile solar panel assembly facility 500, according to certain embodiments. FIG. 5B illustrates a top perspective view of the first portion of the mobile solar panel assembly facility 500. The mobile solar panel assembly facility 500 is merely exemplary, and embodiments of the mobile solar panel assembly facility are not limited to the embodiment shown and presented herein. The mobile solar panel assembly facility can be employed in many different embodiments or examples not specifically depicted or described herein. In the illustrated embodiment, the mobile solar panel assembly facility 500 includes an unload queue 504, a load queue 506, and one or more assembly stations (e.g., 526, 528). Unload queue 504 can be used to unload empty cassettes (e.g., no solar panel assemblies in the cassettes), such as empty cassettes 531-532, from vehicles, such as a first vehicle (not shown) in a truck unloading spot 502. Load queue 506 can be used to load filled cassettes (e.g., filled with solar panel assemblies in the cassettes), such as filled cassettes 535, onto vehicles, such as a second vehicle (not shown) in a truck loading spot 508. Additionally, the load queue 506 can be used to fill empty cassettes (e.g., 533, 534) from the assembly stations 526, 528. Cassettes 531-536 can be similar or identical to cassette 100 (FIG. 1), and various elements of cassettes 531-536 can be similar or identical to various elements of cassette 100 (FIG. 1). The first vehicle (e.g., a vehicle in truck unloading spot 502) and/or the second vehicle (e.g. a vehicle in truck loading spot 508) can be similar or identical to solar panel assembly installation vehicle 600, as shown in FIGS. 6-9 and described below.

In some embodiments, the first vehicle is different from the second vehicle, such that the first vehicle can be unloaded in truck unloading spot 502 while the second vehicle is loaded in truck loading spot 508. Once the second vehicle in truck loading spot 508 is loaded and drives forward and away from the truck loading spot to an installation site, and the first vehicle has unloaded an empty cassette (e.g., 531-532), the first vehicle can proceed from the truck unloading spot to the truck loading spot to be loaded with a filled cassette (e.g., 535). In some embodiments, three or more vehicles can be used, such that concurrently one is being unloaded at unload queue 504, one is being loaded at load queue 506, and one or more is away at an installation site installing solar panel assemblies, and the three or more trucks rotate progressively through these actions.

In many embodiments, the unload queue 504 and the load queue 506 of the mobile solar panel assembly facility 500 can be positioned on the top of a set of flatbeds, such as 8 feet (2.4 m) wide by 40 feet (12.2 m) long flatbeds (e.g., 541, 542). For example, as shown in FIGS. 5A-5B, a surface 540 for the unload queue 504 and load queue 406 is formed by using 17 of these flatbeds positioned closely side-by-side next to each other from the flatbed 541 to the flatbed 542. The surface 540 can be mobile, as the flatbeds are on wheels and can be moved by trucks to various different positions. Similarly, the assembly stations 526, 528 can each be on custom enclosed vehicles and/or the top of flatbeds, such as 10 feet (3.0 m) wide by 48 feet (14.6 m) long flatbeds, which extend lengthwise away from the side of flatbed 542 at the end of the surface 540 proximate to load queue 506. In some embodiments, the mobile solar panel assembly facility 500 can be comprised of a combination of a ground surface, one or more flatbeds of a mobile vehicle, and/or one or more surfaces of a platform structure (e.g., lightweight platforms), instead of all flatbeds. For example, the unload queue 504 can be positioned on a platform structure, and the load queue 506 can be positioned on a flatbed. Embodiments of the assembly stations 526, 528 are further described in detail below in connection with FIGS. 11-20.

During operation, a cassette (e.g., 531) is transferred from the first vehicle in truck unloading spot 502 to the unload queue 504. The unload queue 504 can include one or more cassettes (e.g., 531-532), which can be used to supply empty cassettes to the load queue 506. In some embodiments, the cassettes (e.g., 531-532) can include drive systems, as shown in FIG. 2 and described above, which can be used to move the cassettes within the unload queue 504. In other embodiments, as shown in FIGS. 5A-5B, the unload queue 504 can include an unload conveyor 514 configured to move the cassette (e.g., 531-532) within the unload queue 504.

In some embodiments, such as in the embodiments shown in FIGS. 5A-5B, when a cassette (e.g., 536) reaches a transfer conveyor 518, the transfer conveyor 518 can transfer the cassette (e.g., 536) from the unload queue 504 to the load queue 506. In some embodiments, the load queue 506 can include a load conveyor 516 configured to move the cassettes within the load queue 506. In other embodiments, the cassette includes the drive motors 204 (FIG. 2) to transfer the cassette from the first vehicle in truck unloading spot 502 to the unload queue 504, from the unload queue 504 to the load queue 506, and from the load queue 506 to the second vehicle in truck loading spot 508.

While the cassette is in a fill position of the load queue 506 (such as the positions of cassettes 533-534 shown in FIGS. 5A-5B), solar panel assemblies 300 (FIG. 3) can be loaded into the slots of the cassette (e.g., 533, 534) from the assembly stations 526, 528, respectively. As discussed above, the cassette can include slots (e.g., stanchion rows 104 (FIGS. 1, 3-4) to receive and hold the solar panel assemblies (e.g., 300 (FIGS. 3-4)). Once the slots of the cassette are filled with solar panel assemblies, the filled cassettes (e.g., 535) can be transferred from the load queue 506 to the second vehicle in truck loading spot 508 to transfer the solar panel assemblies to an installation site.

In some embodiments, loading the solar panel assemblies into the slots of the cassette (e.g., 533, 534) at the fill position can involve moving a solar panel assembly from the assembly station (e.g., 526, 528) at which it was assembled to the cassette. This solar panel assembly can be moved from the assembly station (e.g., 526, 528) to the cassette (e.g., 533, 534) at the fill position using conveyors, overhead transporters, and/or other suitable mechanisms. In some embodiments, loading the solar panel assemblies into the slots of the cassette (e.g., 533, 534) at the fill position can include, for each one of the solar panel assemblies, indexing a position of the cassette (533, 534) to align a respective next empty one of the slots with an assembling position 512 of the mobile solar panel assembly facility to facilitate loading of each one of the solar panel assemblies from the assembling position 512 into the respective next empty one of the slots. For example, once a solar panel assembly 551 has been transferred from assembly station 526 onto cassette 533 and once solar panel assembly 552 has been transferred from assembly station 528 onto cassette 534, the cassettes 533 and 534 can be moved approximately 12 inches along the load queue 506 to position the next slots of the cassettes at the assembling positions 512 of assembly stations 526, 528. In some embodiments, loading the solar panel assemblies (e.g., 300) into the slots of the cassette (e.g., 533, 534) can include, for each one of the solar panel assemblies, raising stanchions (e.g., 106 (FIG. 1)) at the respective next empty one of the slots to hold the solar panel assemblies, so that the slot can be ready to receive the next solar panel assembly from the assembly station (e.g., 526, 528).

In some embodiments, loading the solar panel assemblies (e.g., 551, 552) into the slots of the cassette (e.g., 533, 534) further can include, for each one of the solar panel assemblies, coupling a respective wire harness to each one of the solar panel assemblies. For example, once a solar panel assembly (e.g., 551) has been loaded into a slot of the cassette (e.g., 533), a wire harness can be installed from a wire harness sorting station 510 of the mobile solar panel assembly facility 500. In some embodiments, a solar panel assembly can be loaded onto the cassette (e.g., 533, 534) approximately every 60 seconds. In some embodiments, the wire harness can be installed prior to loading the solar panel assemblies (e.g., 551, 553) into the slots of the cassette (e.g., 533, 534).

In some embodiments, the cassette can move in a first widthwise direction 520 within the unload queue 504. In some embodiments, the cassette 100 can move in a second widthwise direction 522 within the load queue 506. In some embodiments, the second widthwise direction is opposite the first widthwise direction. In some embodiments, the cassette 100 can move in a lengthwise direction 524 when being transferred from the unload queue 504 to the load queue 506.

In some embodiments, the solar panel assemblies are assembled at the mobile solar panel assembly facility 500. In some embodiments, the assembly stations 526 and 528 assemble solar panel assemblies concurrently by receiving torque tubes from a torque tube sorting area 550 (shown in FIGS. 5E-5F and described below) that extends widthwise off of assembly station 526, and receiving solar panels from solar panel conveyors (shown in FIGS. 5C-5D and described below) that extend lengthwise off of assembly stations 526 and 528, respectively. The assembly stations 526 and 528 each can add bushings to the torque tube and affix the solar panels to the torque tube using brackets to form the solar panel assembly. In some embodiments, as described above, the wire harness is affixed as soon as the solar panel assembly is transferred to the cassette, while the next solar panel assembly to be loaded on the cassette is being assembled at the assembly station (e.g., 526, 528).

Figure 5C:
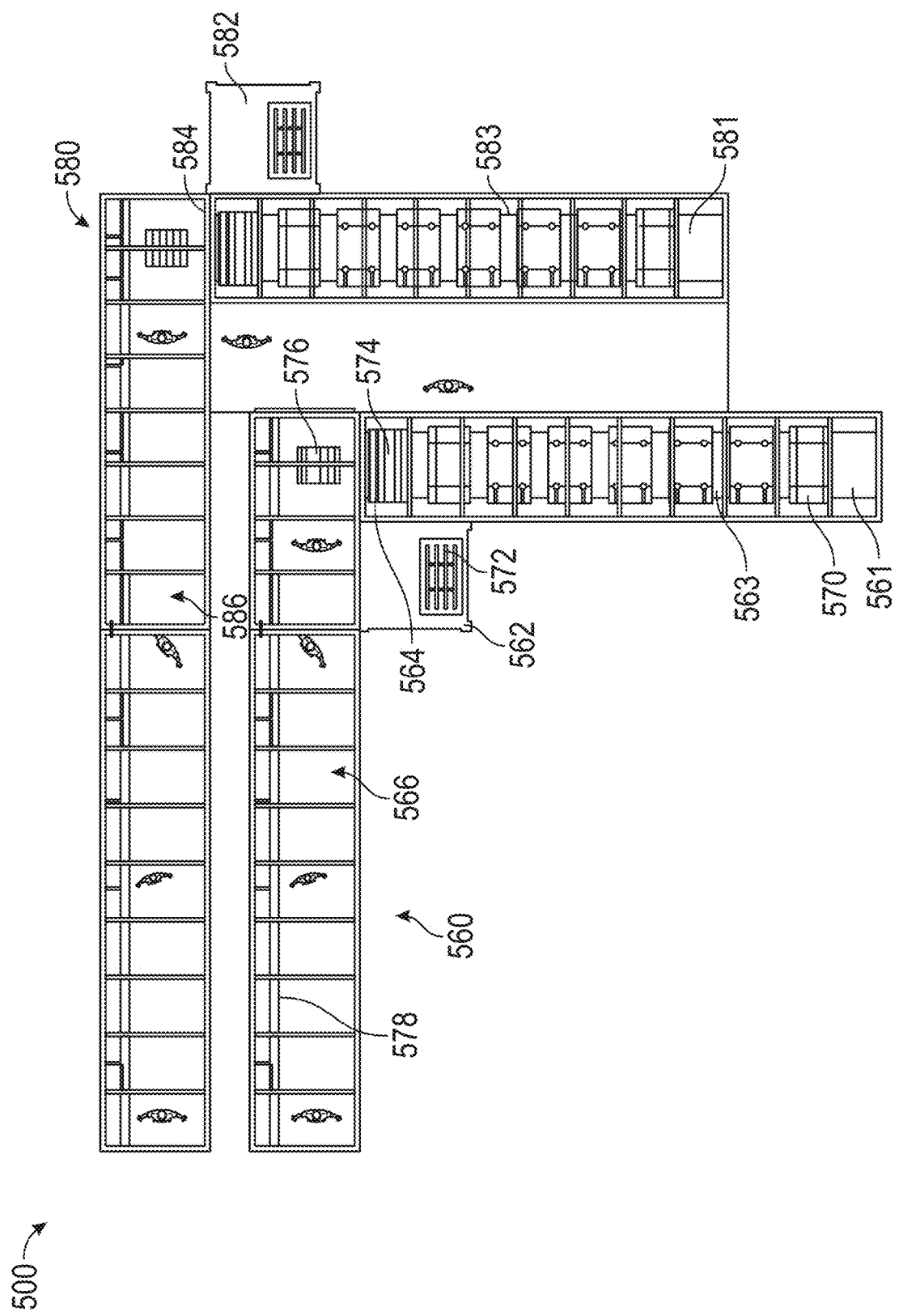
FIG. 5C illustrates a top plan view of a second portion of the mobile solar panel assembly facility of FIG. 5A.
Figure 5D:
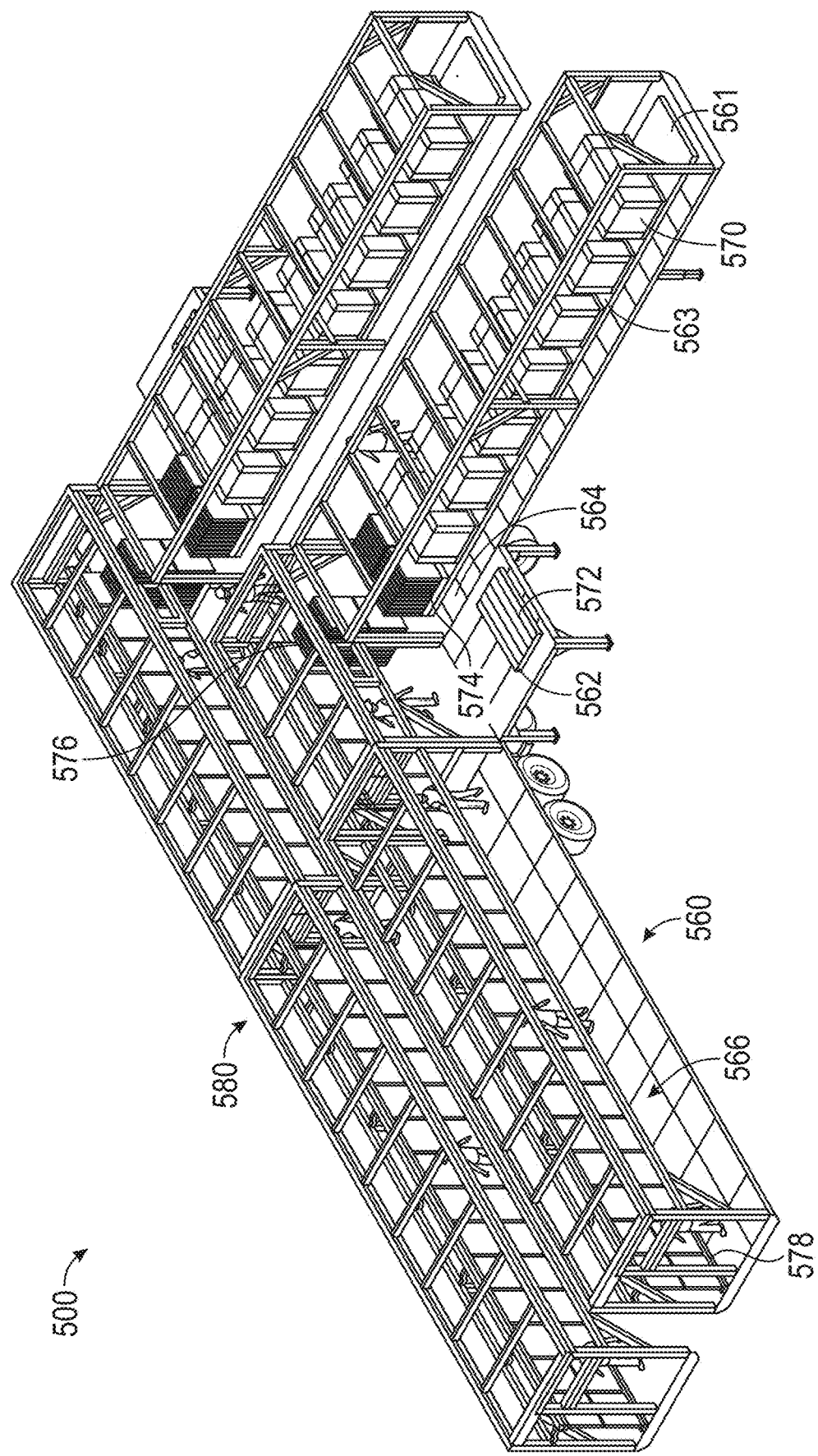
FIG. 5D illustrates a top perspective view of the second portion of the mobile solar panel assembly facility of FIG. 5A.

Turning ahead in the drawings, FIG. 5C illustrates a top plan view of a second portion of the mobile solar panel assembly facility 500. FIG. 5D illustrates a top perspective view of the second portion of the mobile solar panel assembly facility 500. In the illustrated embodiments, the second portion of the mobile solar panel assembly facility 500 includes a first solar panel loading and sorting station 560 and a second solar panel loading and sorting station 580. In many embodiments, first solar panel loading and sorting station 560 can extend off of the first assembly station 526 (FIGS. 5A-5B), and second solar panel loading and sorting station 580 can extend off of the second assembly station 528 (FIGS. 5A-5B). First solar panel loading and sorting station 560 can include a loading area 561, a waste station 562, a pallet conveyor 563, a pallet stripping area 564, and an accumulation area 566. Second solar panel loading and sorting station 580 can include similar elements, such as a loading area 581, a waste station 582, a pallet conveyor 583, a pallet stripping area 584, and a sorting area 586, which can be similar or identical to loading area 561, waste station 562, pallet conveyor 563, pallet stripping area 564, and accumulation area 566, respectively.

Figure 17:
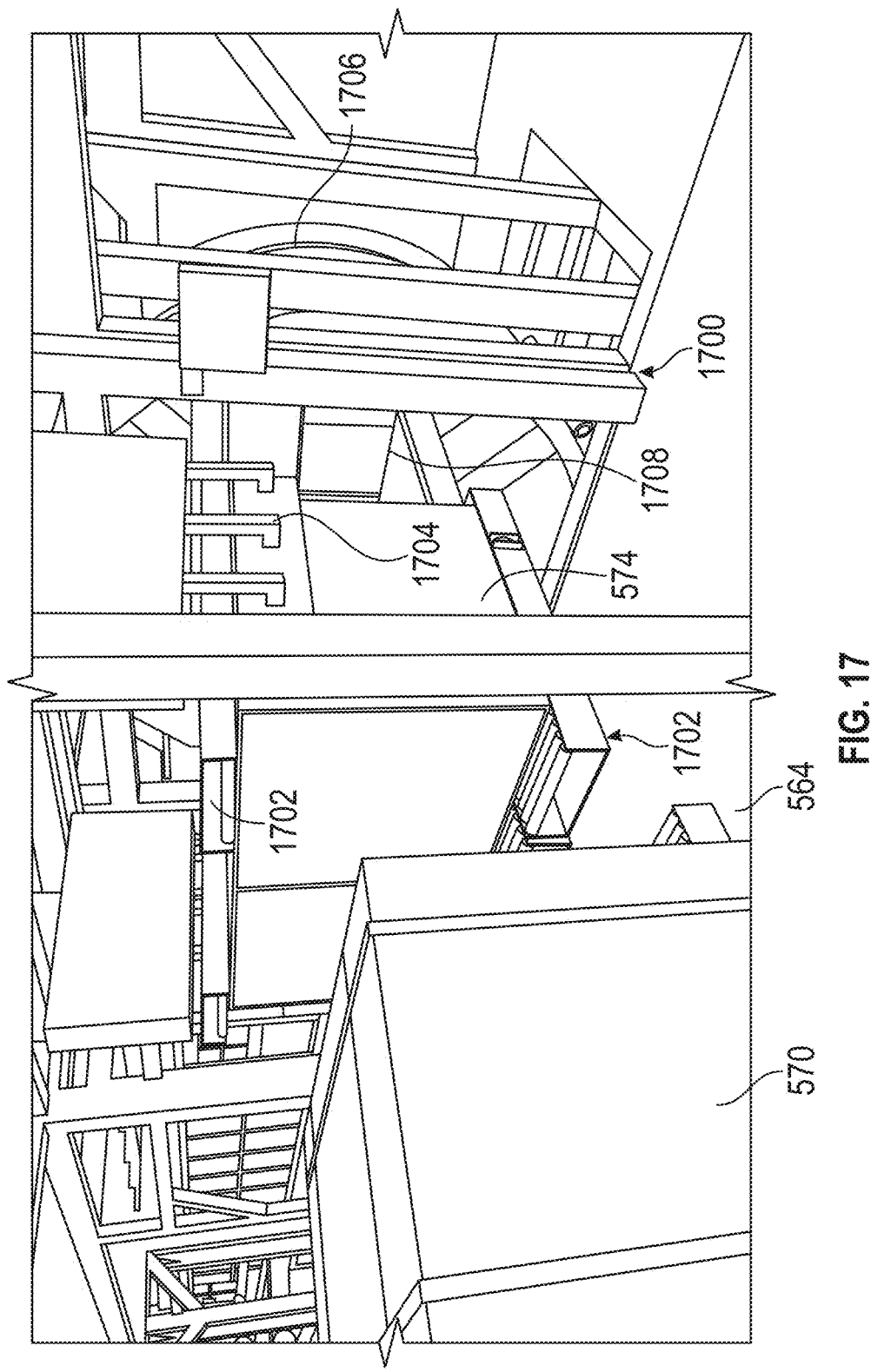
FIG. 17 illustrates a perspective view of a strip station, which can be included in another embodiment of the mobile solar panel assembly facility of FIG. 5A.

During operation, solar panel packages 570 are unloaded from a vehicle at the loading area 561 and positioned on the pallet conveyor 563. The pallet conveyor 563 operates to move the solar panel packages 570 toward the pallet stripping area 564. At the pallet stripping area 564, the solar panel packages 570 are unpacked and the waste (e.g., 572) is unloaded at the waste station 562. In some embodiments, the solar panel packages 570 can include solar panels, cardboard, and pallets. In some embodiments, the solar panels 574 are removed from the solar panels packages 570, and the solar panels 574 are moved to the accumulation area 566 while the packaging of the solar panel packages 570 are stripped and unloaded at to the pallet stripping area 564. In some embodiments, a portion 576 of the solar panels 574 are fed into the accumulation area 566 based on a solar panel assembly specification. In some embodiments, portion 576 can be in a different orientation from solar panels 574, which can be achieved using strip station 1700 (FIG. 17, described below). For example, a solar panel assembly may be specified to include 8 solar panels. Accordingly, the portion 576 can represent 8 solar panels from the solar panels 574 from the solar panel package 570. Based on the solar panel assembly specification, each solar panel from the portion 576 is loaded individually onto a conveyor 578 in the accumulation area 566. Conveyor 578 can move the solar panels along the accumulation area 566 to the first assembly station 526 (FIGS. 5A-5B), where the solar panels can be aligned and coupled together (discussed in more detail below) on a torque tube, after which the solar panel assembly is loaded onto a cassette (e.g., 533 (FIGS. 5A-5B)) and transferred to the installation site. Second solar panel loading and sorting station 580 can operate similar to first solar panel loading and sorting station 560. In some embodiments, the solar panels 574 are fed into the accumulation area 566 to maintain the accumulation area 566 at a full capacity with solar panels. For example, each solar panel from the solar panels 574 is loaded individually onto a conveyor 578 in the accumulation area 566. Conveyor 578 can move the solar panels along the accumulation area 566 to the first assembly station 526 (FIGS. 5A-5B), and additional solar panels 574 can be fed into the accumulation area 566 to fill the space of the solar panels 574 that have been positioned in first assembly station 526.

Turning ahead in the drawings, FIG. 5E illustrates a top perspective view of a third portion of the mobile solar panel assembly facility 500. FIG. 5F illustrates a side elevational view of the third portion of the mobile solar panel assembly facility 500. In the illustrated embodiments, the third portion of the mobile solar panel assembly facility includes the torque tube sorting area 550. In some embodiments, the torque tube sorting area 550 can be positioned on the top of a set of flatbeds 553, or in enclosed trailers. The torque tube sorting area 550 can include a set of conveyors 555 on each of the flatbeds 553. For example, the set of conveyors 555 can include conveyors 591-594. In some embodiments, the torque tube sorting area can include jib booms 556, which can be used to move torque tubes 559 from a supply area 554 onto the set of conveyors 555. Various ones of the torque tubes 559 can be placed on different ones of the conveyors (e.g., 591-594) depending on the length of the torque tubes 559, such that different conveyors (e.g., 591-594) carry torque tubes (e.g., 559) of different lengths. In some embodiments, torque tubes can be fit with a torque tube extension to ensure the torque tube is stable and can fit within the conveyors (e.g., 591-594).

In some embodiments, a conveyor 557 can the transfer the torque tubes 559 from the set of conveyors 555 to first assembly station 526, and a conveyor 558 can transfer the torque tubes 559 from the set of conveyors 555 to the second assembly station 528. In some embodiments, as shown in FIG. 5F, the conveyor 558 can lift the torque tubes 559 at a first side of the first assembly station 526 and lower the torque tubes 559 at a second side of the first assembly station 526 to provide the torque tubes 559 to the second assembly station 528.

Figure 5G:
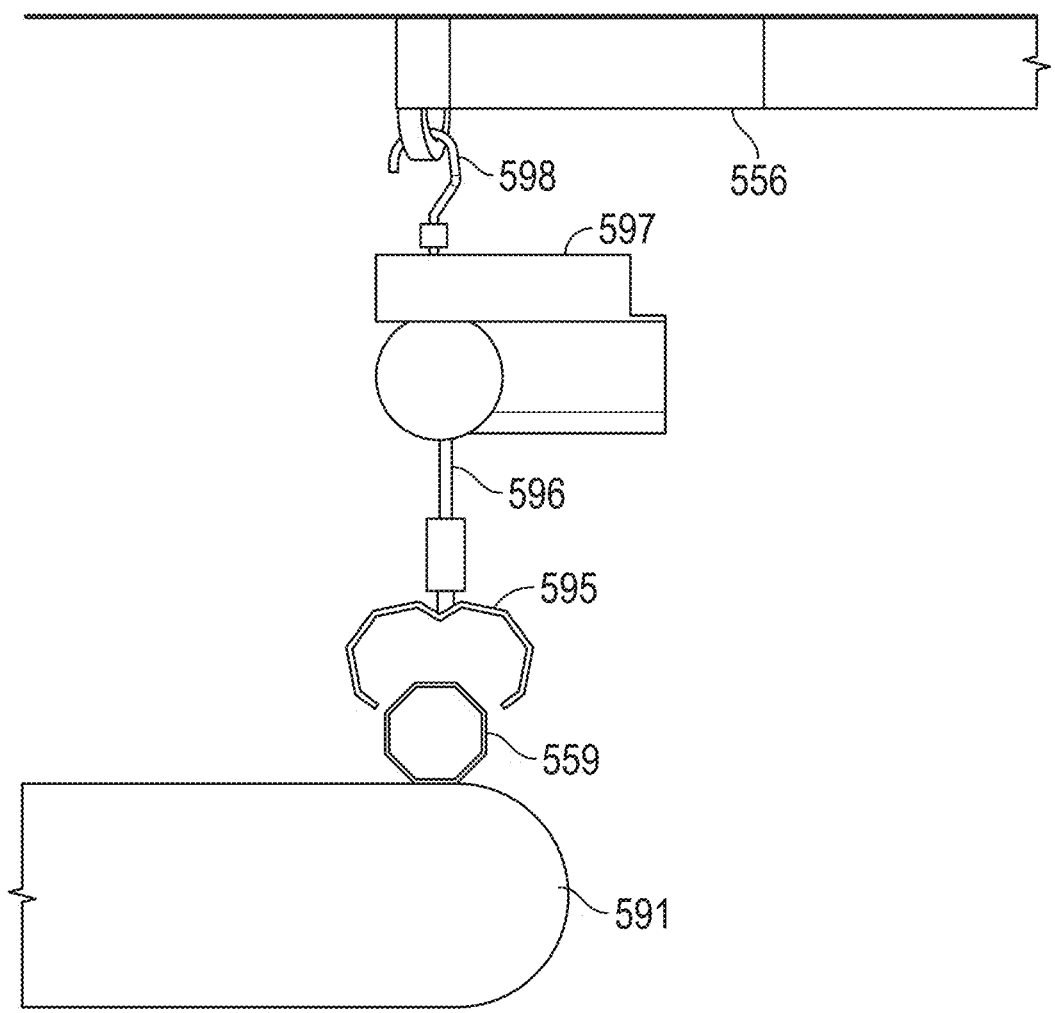
FIG. 5G illustrates a side elevational view of a close-up of a portion of the jib boom and the conveyor, as shown in FIGS. 5E-5F.

Turning ahead in the drawings, FIG. 5G illustrates a side elevational view of a close-up of a portion of the jib boom 556 and the conveyor 591, as shown in FIGS. 5E-5F. As shown in FIG. 5G, the jib boom 556 can include a retention element 595 that is attached to a wire 596. In some embodiments, the wire 596 can be connected to the jib boom 556 using a hook 598. In some embodiments, a load balancer 597 can be included between the hook 598 and the wire 596. In a number of embodiments, the retention element 595 can be configured to retain and lift the torque tubes 559, such as to place the torque tubes 559 on conveyor 591 or another one of the conveyors (e.g., 592-594 (FIGS. 5E-5F)). In some embodiments, the torque tube sorting area can include a load balancer on a set of monorails, which can be used to move torque tubes 559 from a supply area 554 onto the set of conveyors 555, or other suitable elements.

Figure 10:
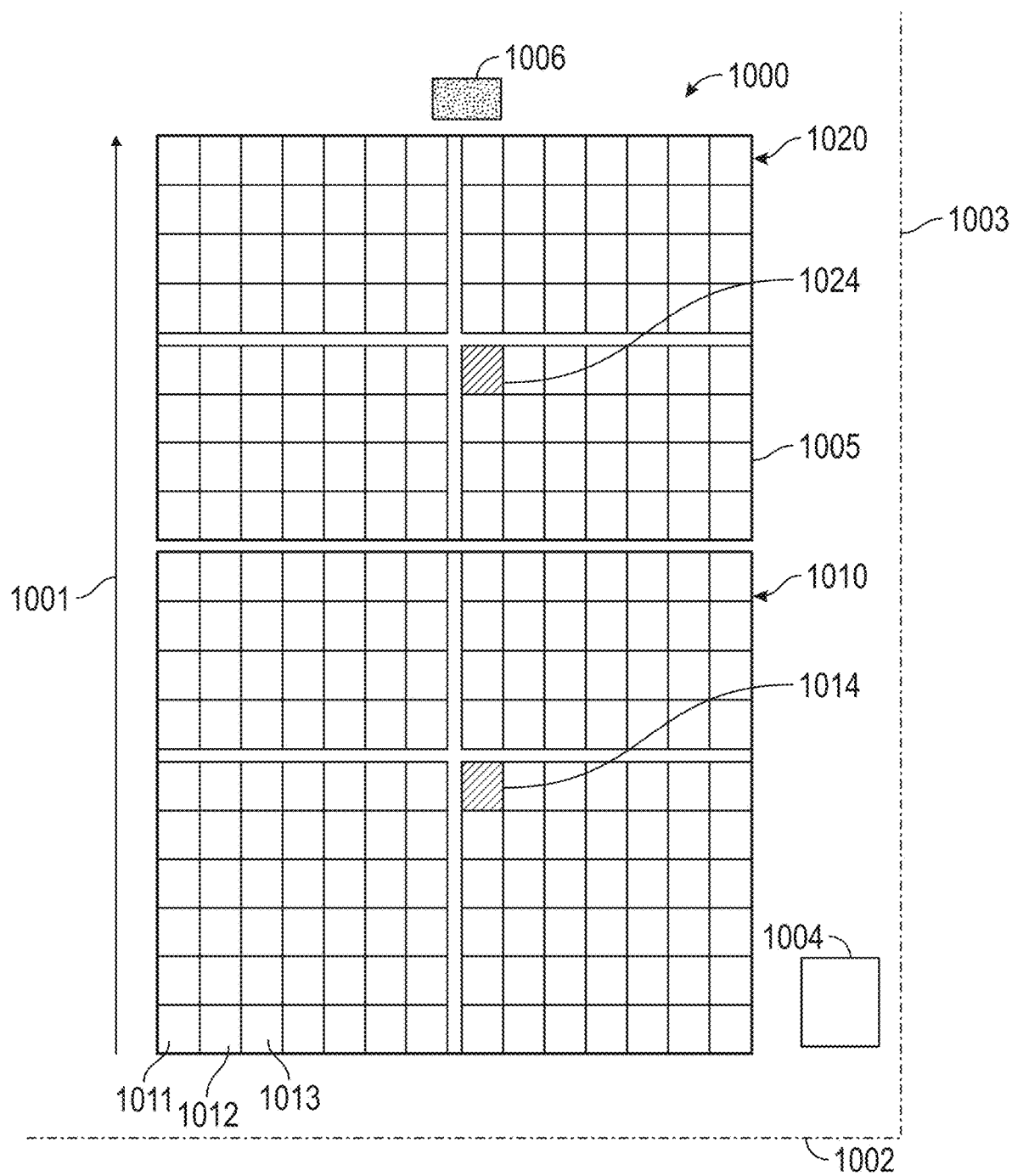
FIG. 10 illustrates a top plan view of an exemplary solar project installation site, according to certain embodiments.

Jumping ahead in the drawings, FIG. 10 illustrates a top plan view of an exemplary solar project site 1000, according to certain embodiments. As shown in FIG. 10, the solar project site 1000 can be next to a main road 1002 and a side road 1003, with plant roads 1005 throughout the area of the solar project site 1000. In some embodiments, the solar project site 1000 can include an administration building 1004 and a switchyard 1006. In some embodiments, the solar project site 1000 can include an area that is sectioned into blocks, such as blocks 1011-1013. In some embodiments, each block can include approximately 30 rows of solar panels, with each row having approximately 100 solar panels. For example, twelve solar panel assemblies can be installed on a row, and joined together to form a row of approximately 100 solar panels. In such a configuration, each block can be approximately 600 feet (182.9 m) by 400 feet (121.9 m), and can produce 1 MW. In the example shown in FIG. 10, there are 252 blocks. The blocks can be built in direction 1001. The first 140 of these blocks can be designated as part of a first build area 1010, and the second 112 of these blocks can be designated as part of a second build area 1020. While solar panel assemblies are being installed in the blocks of the first build area 1010, the mobile solar panel assembly facility 500 (FIGS. 5A-5F) can be located at a block 1014 that is centrally located within the first build area 1010. When the blocks of the first build area 1010 are completed, the mobile solar panel assembly facility 500 (FIGS. 5A-5F) can be relocated to a block 1024 that is centrally located within the second build area 1020. By relocating the mobile solar panel assembly facility 500 (FIGS. 5A-5F) during the build of solar project site 1000, the driving distance from the mobile solar panel assembly facility 500 to the installation site along the rows of the blocks can be limited. In some embodiments, block 1014 and/or block 1024 can be installed with solar panels after the mobile solar panel assembly facility 500 (FIGS. 5A-5F) are moved away from those respective blocks. In other embodiments, the solar panel assemblies can be assembled outside of the project site envelope (complex) or fully away from the solar project site 1000, such as at a non-mobile solar panel assembly facility, and transported to the solar project site 1000.

Figure 7:
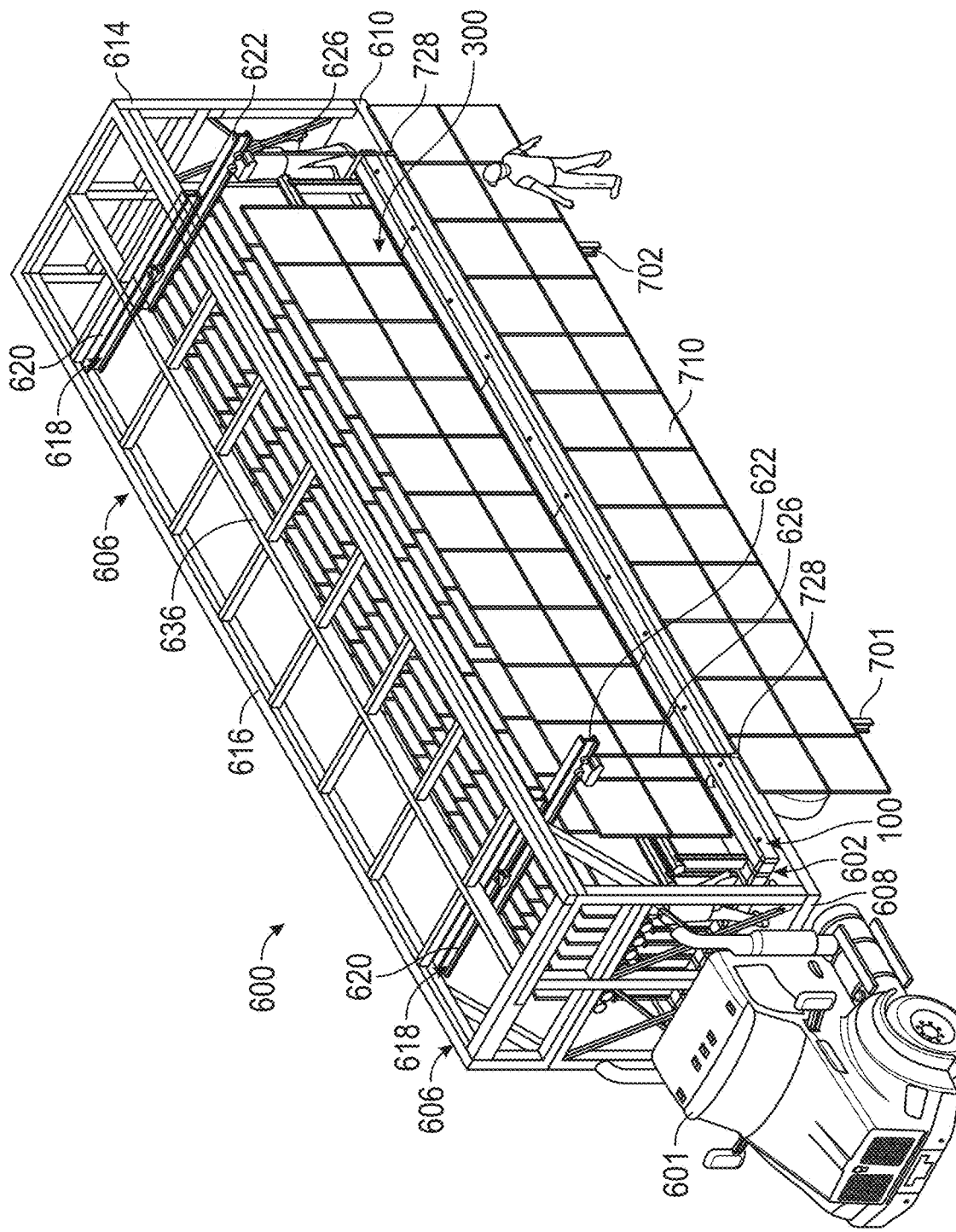
FIG. 7 illustrates a top, front, driver-side perspective view of the solar panel assembly installation vehicle of FIG. 6.
Figure 8:
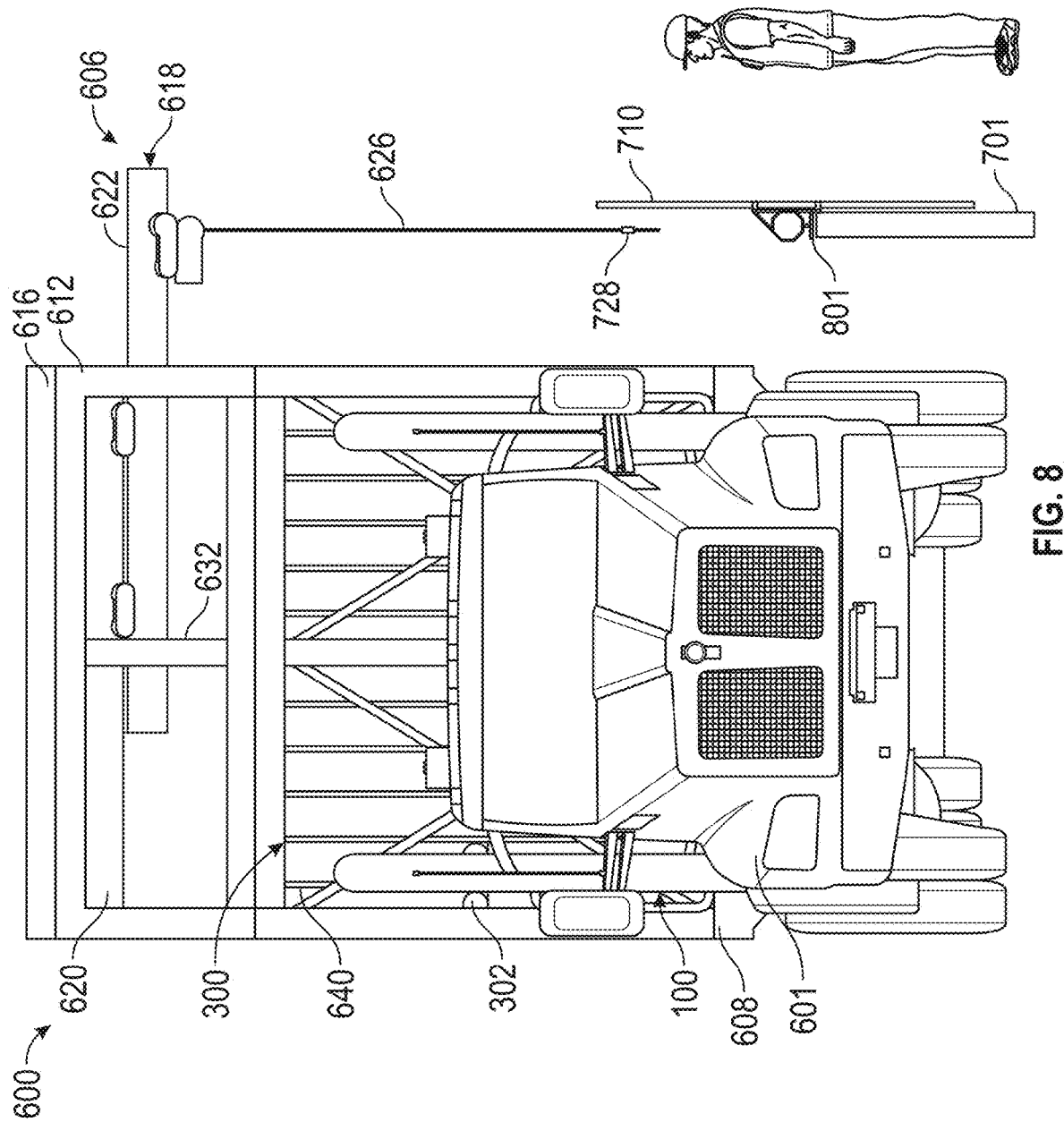
FIG. 8 illustrates a front elevational view of the solar panel assembly installation vehicle of FIG. 6.

Turning back in the drawings, FIG. 6 illustrates a top, front, passenger-side perspective view of an exemplary solar panel assembly installation vehicle 600, according to certain embodiments. FIG. 7 illustrates a top, front, driver-side perspective view of the solar panel assembly installation vehicle 600. FIG. 8 illustrates a front elevational view of the solar panel assembly installation vehicle 600. FIG. 9 illustrates a top plan view of a portion of the solar panel assembly installation vehicle 600 without a support structure 604 and an unloader 606. In some embodiments, the solar panel assembly installation vehicle 600 includes a cab 601, a vehicle truck bed 602, the support structure 604, and/or the unloader 606. In some embodiments, the vehicle truck bed 602 includes a first end 608 and a second end 610. In some embodiments, the support structure 604 includes (i) a first vertical portion 612 positioned at the first end 608 of the vehicle truck bed 602, (ii) a second vertical portion 614 positioned at the second end 610 of the vehicle truck bed 602, and (iii) a horizontal portion 616 that is coupled to the first vertical portion 612 and the second vertical portion 614. In other embodiments, other configurations of support structure can be used, such as arches, domes, or other suitable support structures. In some embodiments, the unloader 606 is coupled to the horizontal portion 616 and configured to unload the solar panel assemblies 300 from the cassette 100 that is being carried on the vehicle truck bed 602.

In some embodiments, the unloader 606 can include telescoping monorails 618. In other embodiments, other suitable unloaders can be used, such as jib booms or other suitable unloaders. In some embodiments, the telescoping monorails 618 include a first portion 620 coupled to the horizontal portion 616 and a second portion 622 coupled (e.g., slidably coupled) to the first portion 620. In some embodiments, the second portion 622 is configured to move along a length of the first portion 620.

In some embodiments, the telescoping monorails 618 include a load balancer (not shown). In some embodiments, the telescoping monorails include a cable 626 having a first end adjacent to the second portion 622 and a second end. In some embodiments, the telescoping monorails 618 includes a retention tool 728 coupled to the second end of the cable 626. In some embodiments, the retention tool 728 is configured to retain and lift the solar panel assemblies 300 individually.

In some embodiments, the support structure 604 is removably attached to the solar panel assembly installation vehicle 600. In some embodiments, the support structure 604 is configured to be removable from the solar panel assembly installation vehicle 600 to facilitate transport of the solar panel assembly installation vehicle 600 on public roads away from the solar project installation area.

In some embodiments, the solar panel assembly installation vehicle 600 includes a conveyor (not shown) that is configured to move the cassette 100 on the vehicle truck bed 602.

In some embodiments, the first vertical portion 612 includes a first frame spacer 632, the second vertical portion 614 includes a second frame spacer 634, and the horizontal portion 616 includes a frame 636. In some embodiments, the horizontal portion 616 includes a cover that extends across the frame 636, which can provide shade and/or cover from rain.

In some embodiments, the solar panel assembly installation vehicle 600 includes axles (not shown). In some embodiments, each of the axles is driven and steerable. As such, the solar panel assembly installation vehicle 600 is able to crab steer into a position along a pile row at an installation site to facilitate the installation of the solar panel assemblies 300. In some embodiments, the solar panel assembly installation vehicle 600 can include one or more side-slope levelers (not shown) to maintain center-of-gravity within prescribed safety margins given the load and trim as needed to keep work environment level and comfortable. The axles allow for platform stability, minimal turn radius, and load stability. In some embodiments, the solar panel assembly installation vehicle 600 is outfitted with commercially available GPS system with fore and aft sensors so a driver can stay on a predetermined line in relation to the pile row.

In some embodiments, the solar panel assemblies 300 include the torque tube 302, a set of solar panels 640 affixed to the torque tube 302 with brackets 642, bushings 644 configured to attach the torque tube 302 to pile caps (e.g., 801) at the top of piles (e.g., 701, 702), and a wire harness 646.

In some embodiments, the solar panel assemblies on a filled cassette (e.g., 100) are removed from the cassette when the solar panel assembly installation vehicle 600 (onto which the filled cassette has been loaded) arrives at an installation site. In some embodiments, removing the solar panel assemblies 300 from the cassette 100 can include individually lifting each respective one of the solar panel assemblies 300 and transferring each respective one of the solar panel assemblies 300 in a first widthwise direction to a position above a respective installation position along a pile row (e.g., of piles 701, 702) of the installation site. In some embodiments, each respective one of the solar panel assemblies 300 is lowered onto respective pile caps (e.g., 801 (FIG. 8, described below)) at the respective installation position.

For example, as shown in FIGS. 7-9, when the solar panel assembly installation vehicle 600 is positioned at an installation position along a pile row of piles (e.g., 701-702), a solar panel assembly 710 of solar panel assemblies 300 that was lifted to be removed from the cassette 100 and swung outward by the unloader 606 to be positioned over the pile row, the solar panel assembly 710 can be lowered onto the pile caps (e.g., 801) at the top of the piles (e.g., 701-702), such that the bushings 644 (FIG. 6) engage with the pile caps (e.g., 801).

In some embodiments, a coupler is installed on a first torque tube of a first solar panel assembly to couple a second torque tube of a second solar panel assembly to the first torque tube. For example, there can be couplers installed between each set of torque tubes on a block row. In some embodiments, the second solar panel assembly is moved in a lengthwise direction toward the first solar panel assembly to position the second torque tube within the coupler and couple the second torque tube to the first torque tube. In some embodiments, the solar panel assembly installation vehicle 600 is driven forward to a respective subsequent one of the respective installation positions along the pile row between removing each respective one of the solar panel assemblies 300.

In some embodiments, the cassette 100 is maneuvered on the solar panel assembly installation vehicle 600 in a second widthwise direction opposite the first widthwise direction to facilitate removing the solar panel assemblies 300 from the cassette 100. For example, the cassette 100 can be moved in the direction of the passenger side of the solar panel assembly installation vehicle 600 up to approximately 24 inches (60.96 centimeters (cm)) to provide space on the vehicle truck bed 602 for workers to assist with handling the solar panel assemblies, such as attaching the retention tool 728 to the solar panel assemblies 300. In some embodiments, the cassette 100 can include a drive system, such as shown in FIG. 2 and described above, which can be used to move the cassette on the vehicle truck bed 602. In other embodiments, the vehicle truck bed 602 can include a conveyor to move the cassette 100 on the vehicle truck bed 602. In some embodiments, as shown in FIGS. 7 and 9, there can be additional room at the front of the truck bed and the rear of the truck bed beyond each end of the cassette 100 to allow the workers space to assist with handling the solar panel assemblies 300.

Figure 11:
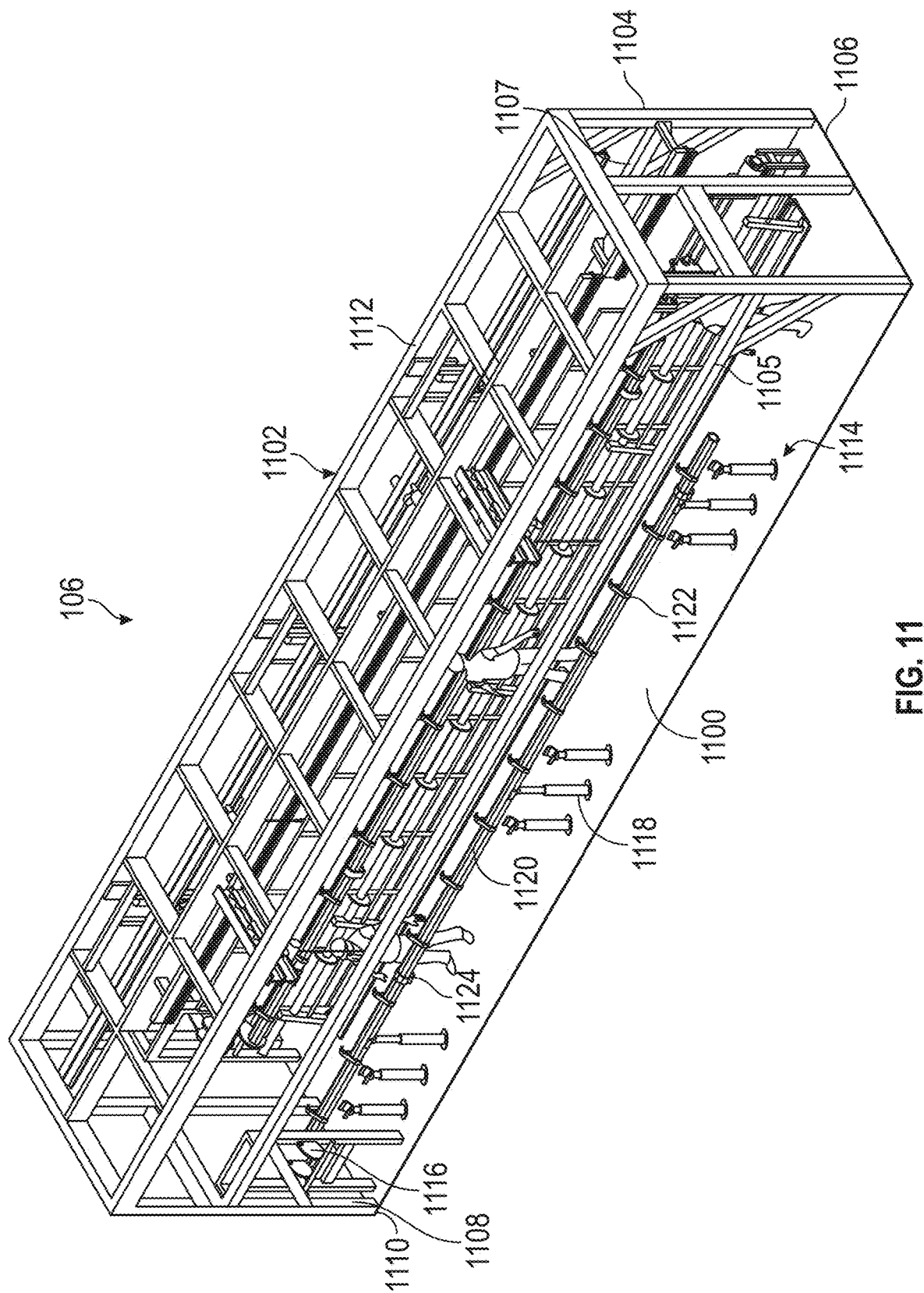
FIG. 11 illustrates a top perspective view of the first assembly station of FIG. 5A.

FIG. 11 illustrates a top perspective view of the first assembly station 526. The first assembly station 526 is merely exemplary, and embodiments of the first assembly station are not limited to the embodiment shown and presented herein. The first assembly station 526 can be employed in many different embodiments or examples not specifically depicted or described herein. In the illustrated embodiment, the first assembly station 526 includes a base 1100 and a structure 1102. In the illustrated embodiment, the base 1100 is a flatbed of a semi-trailer. In some embodiments, the base 1100 can be a ground surface, a flatbed of a mobile vehicle, or a surface of a fixed structure. In the illustrated embodiment, the structure 1102 includes (i) a first vertical portion 1104 positioned at the first end 1106 of the base 1100, (ii) a second vertical portion 1108 positioned at the second end 1110 of the base 1100, and (iii) a horizontal portion 1112 that is coupled to the first vertical portion 1104 and the second vertical portion 1108. In a number of embodiments, structure 1102 can include a front portion 1105 and/or a rear portion 1107. In some embodiments, at least a portion of structure 1102 can be covered to provide shade and/or cover from rain.

The first assembly station 526 can include a torque tube load rack 1114, which can be coupled to the base 1100 and/or to structure 1102. In some embodiments, the torque tube load rack 1114 can include a linear positioner, such as hard stops 1116 or an automatically controlled linear positioner, and stanchions 1118. In some embodiments, the stanchions 1118 are hydraulic stanchions, which can be adjusted to various different heights using a foot-activated actuator. In some embodiments, the stanchions 1118 are in a fixed position and are manually or automatically adjusted based on the specifications of a solar panel assembly. The stanchions 1118 can be configured to receive a torque tube 1120. In some embodiments, the stanchions 1118 can include saddles, and in some embodiments, the saddles can include rollers to allow the rollers to allow the torque tube 1120 to rotate within the saddles. The hard stops 1116 can be configurable to abut ends of the various different torque tubes (e.g., 1120) at different positions. In some embodiments, a solar panel assembly specification can specify that a torque tube of a solar panel assembly intended for a certain installation position has a certain amount of overhang at the end of the solar panel assembly beyond the end of the solar panels in order to be coupled with a neighboring solar panel assembly. In various embodiments, the torque tube 1120 can be loaded into torque tube load rack 1114 through an opening in front portion 1105. In some embodiments, the torque tube 1120 can be loaded from the first end 1106 via an adjacent accumulation area (e.g., 566 (FIG. 5)).

In some embodiments, one of the hard stops 1116 can be selected and utilized to abut an end of the torque tube 1120 to account for the overhang. In some embodiments, a subsequent solar panel assembly can involve another amount of overhang different from the previous overhang. Accordingly, another one of the hard stops 1116 can be utilized to abut an end of a subsequent torque tube to account for the overhang. In some embodiments, brackets 1122 and bushings 1124 can be coupled to the torque tube 1120 based on the specifications of the particular solar panel assembly. In some embodiments, the hard stops 1116 are operated manually by an operator, or the hard stops 1116 can be operated autonomously based on the specifications of a particular solar panel assembly (e.g., measurement of overhang from a prior/future torque tube). In some embodiments, the brackets 1122 are positioned on the torque tube 1120 based on respective locations of corresponding solar panels, and the bushings 1124 are positioned on the torque tube 1120 based on respective locations of corresponding pile caps at an installation site. In some embodiments, the positions of the brackets and/or the bushings can be specified in the solar panel assembly specification.

Figure 12:
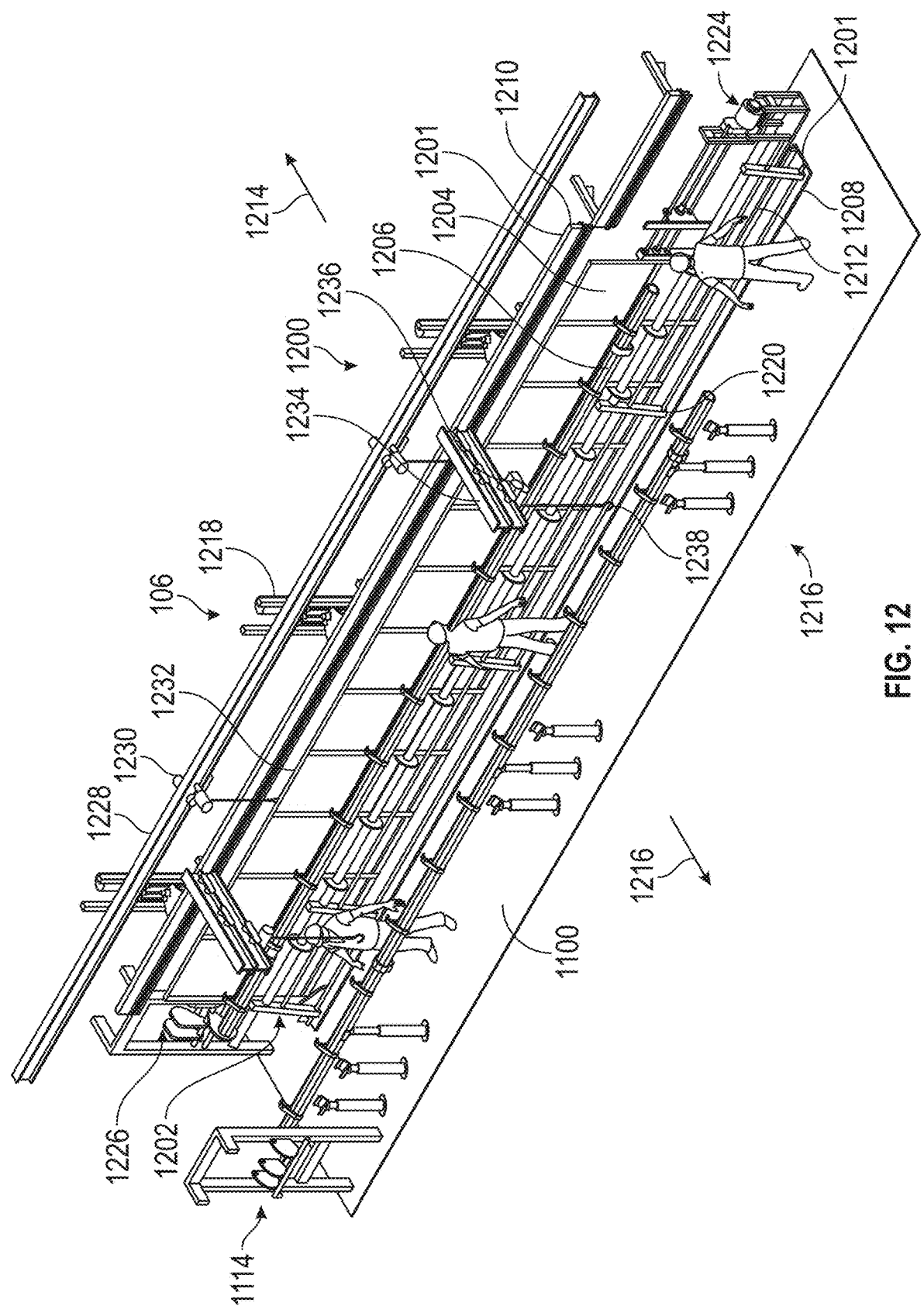
FIG. 12 illustrates a top perspective view the first assembly station of FIG. 5A without the structure of FIG. 11, showing a jig.

Turning ahead in the drawings, FIG. 12 illustrates a top perspective view of the first assembly station 526 without the structure 1102, showing a jig 1200. The jig 1200 is merely exemplary, and embodiments of the jig are not limited to embodiments presented herein. The jig 1200 can be employed in many different embodiments or examples not specifically depicted or described herein. In a number of embodiments, the jig 1200 can be used to affix solar panels 1204 to a torque tube 1206 to form a solar panel assembly, with the solar panels aligned and spaced according to specifications. For example, in some embodiments, up to twelve solar panels (e.g., 1204) can be affixed to a torque tube (e.g., 1206) using the jig. In the illustrated embodiment, the jig 1200 is illustrated coupled to the base 1100 behind the torque tube load rack 1114. In some embodiments, the jig 1200 can include a track system 1201, a torque tube support structure 1202, a panel aligner 1400 (FIG. 14, described below), a compressing actuator 1224, and/or hard stops 1226.

In some embodiments, the torque tube support structure 1202 is configured to support the torque tube 1206 in a fixed position. For example, after a torque tube has been positioned on torque tube load rack 1114, and brackets and bushings have been installed on the torque tube, the torque tube can be moved to torque tube support structure 1202 and placed in the fixed position. In some embodiments, the track system 1201 can be configured to support and to align the solar panels 1204 along the torque tube 1206 when the torque tube 1206 is supported in the fixed position on torque tube support structure 1202, to allow the solar panels 1204 to be affixed to the torque tube 1206 to form a solar panel assembly.

In some embodiments, the track system 1201 can include a first track 1208 coupled to the base 1100 and a second track 1210 coupled to the structure 1102 (e.g., the horizontal portion 1112 of the structure 1102). In some embodiments, the first track 1208 can include a first conveyor 1212 that is configured to move the solar panels 1204 along a length of the first track 1208. In some embodiments, the second track 1210 is configured to pivot in a first direction 1214 to position the solar panels 1204 in the first track 1208. In some embodiments, the second track 1210 is configured to pivot in a second direction 1216 to remove the solar panels 1204 from the first track 1208. In some embodiments, the second track 1210 is parallel with the first track 1208 when the solar panels 1204 are positioned in the first track 1208 and the second track 1210. In some embodiments, the second track 1210 is operated away from the solar panels 1204 and toward the solar panels 1204 via an actuator 1218. In some embodiments, the actuator 1218 operates the second track 1210 to assist in maintaining and releasing the solar panels 1204 from the first track 1208. In some embodiments, the second track 1210 includes a conveyor that is configured to move the solar panels 1204 along a length of the first track 1208. In some embodiments, the track system 1201 is an alignment system. In other embodiments, other alignment system can be used, such as first track 1208, second track 1210, or longitudinal rails, individual aligners for the respective solar panels that work collectively to alignment to solar panels, etc.

Figure 13:
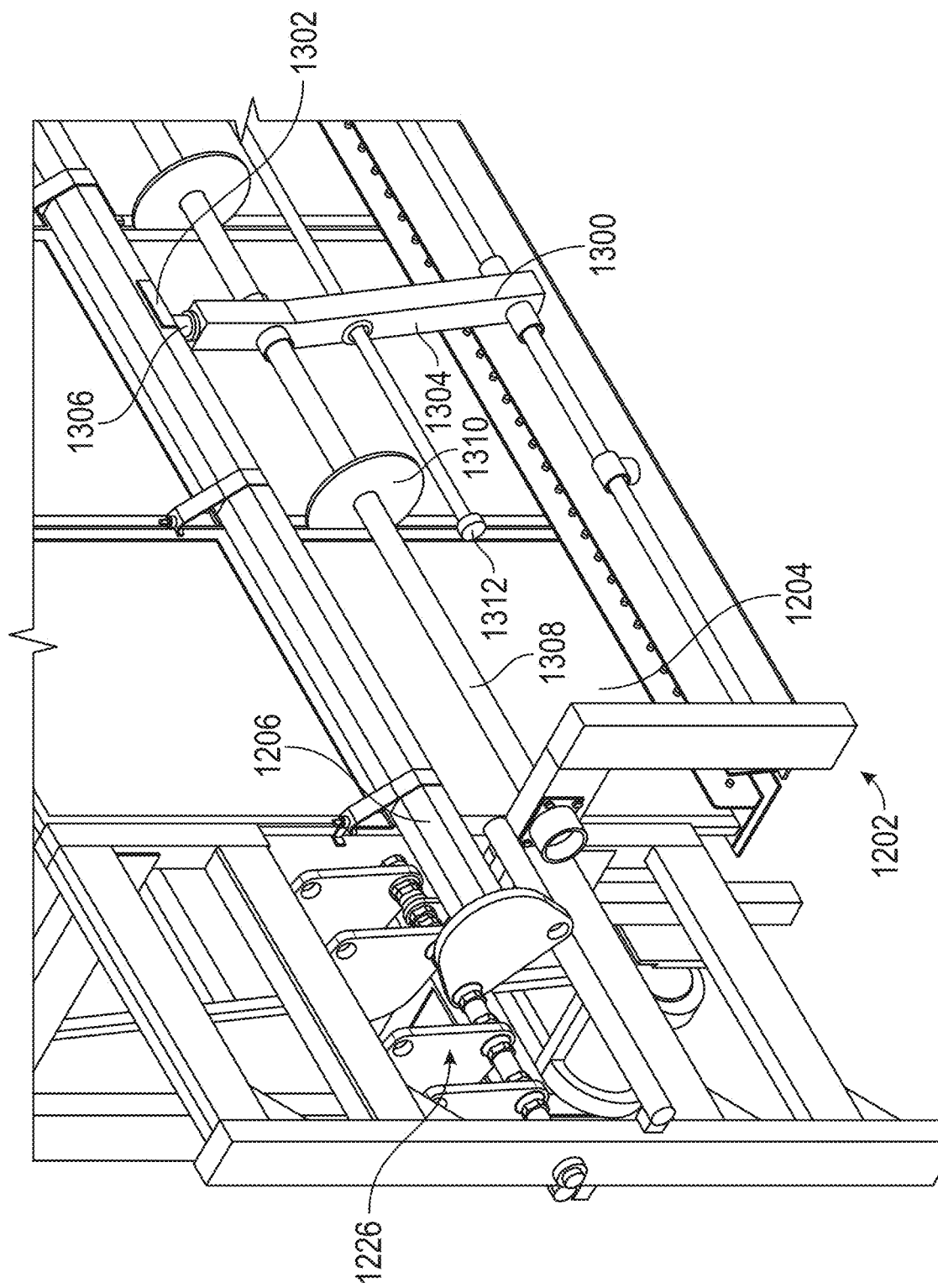
FIG. 13 illustrates a portion of the torque tube support structure and the hard stops of the jig of FIG. 12.

Turning ahead in the drawings, FIG. 13 illustrates the torque tube support structure 1202 and the hard stops 1226 of the jig 1200 (FIG. 12). The torque tube support structure 1202 can include stanchions 1300 that are configured to hold the torque tube 1206 in the fixed position (e.g., a fixed height). The stanchions 1300 can include saddles 1302 that are configured to receive the torque tube 1206. In some embodiments, the stanchions 1300 can include a tube 1304 and a rod 1306 positioned within the tube 1304. In some embodiments, the saddle 1302 is coupled to the rod 1306 and the saddle 1302 is positioned external to the tube 1304.

In some embodiments, a spacer rod 1308 passes through each of the stanchions 1300 and the spacer rod 1308 includes spacers 1310 positioned along a length of the spacer rod 1308. The spacer rod 1308 can include enough spacers (e.g., 1310) to separate each of the solar panels 1204 to be affixed to torque tube 1206. For example, when the jig (1200) is configured to affix up to twelve solar panels (e.g., 1204) to a torque tube (e.g., 1206), the spacer rod can include eleven spacers (e.g., 1310). In some embodiments, the spacers 1310 are sized based on a specification for a particular solar panel assembly. That is, the spacers 1310 are sized to space the solar panels 1204 apart a specified distance so that the torque tube 1206 can be coupled to the solar panels 1204 to form a solar panel assembly. For example, the spacers can have a thickness of approximately ⅜ inch (0.95 centimeters (cm)), or another suitable thickness. In some embodiments, such as those shown in FIG. 13, the spacers can be discs. In other embodiments, other suitable shapes can be used.

In some embodiments, a handle rod 1312 passes through each of the stanchions 1300 and is operable to pivot away the stanchions 1300 from the track system 1201 to assist with removing the solar panel assembly once it is assembled. In some embodiments, after the solar panels 1204 have been affixed to the torque tube 1206, an operator can utilize the handle rod 1312 to facilitate pulling the solar panel assembly away from the track system 1201 so that the solar panel assembly can be moved to be loaded onto a cassette or positioned on pile caps for installation. In some embodiments, automated controls can utilize the handle rod 1312 to facilitate pulling the solar panel assembly away from the track system 1201 so that the solar panel assembly can be moved to be loaded onto a cassette or positioned on pile caps for installation.

In some embodiments, the hard stops 1226 can be positioned at an end of the track system 1201. In some embodiments, the hard stops 1226 are configurable to abut ends of the various different torque tubes (e.g., 1206) at different positions. As explained above, a solar panel assembly specification can specify that a torque tube of a solar panel assembly intended for a certain installation position has a certain amount of overhang at the end of the solar panel assembly beyond the end of the solar panels in order to be coupled with a neighboring solar panel assembly. In some embodiments, one of the hard stops 1226 can be selected and utilized to abut an end of the torque tube 1206 to account for the overhang. In some embodiments, a subsequent solar panel assembly can involve another amount of overhang different from the previous overhang. Accordingly, another one of the hard stops 1226 can be utilized to abut an end of a subsequent torque tube to account for the overhang. In many embodiments, the hard stops 1226 can be similar or identical to the hard stops 1116 (FIG. 11), and the selected one of the hard stops 1116 (FIG. 11) used for a particular torque tube on torque tube load rack 1114 (FIG. 11) can correspond to the selected one of the hard stops 1226 used when the same torque tube is moved to torque tube support structure 1202.

Figure 14:
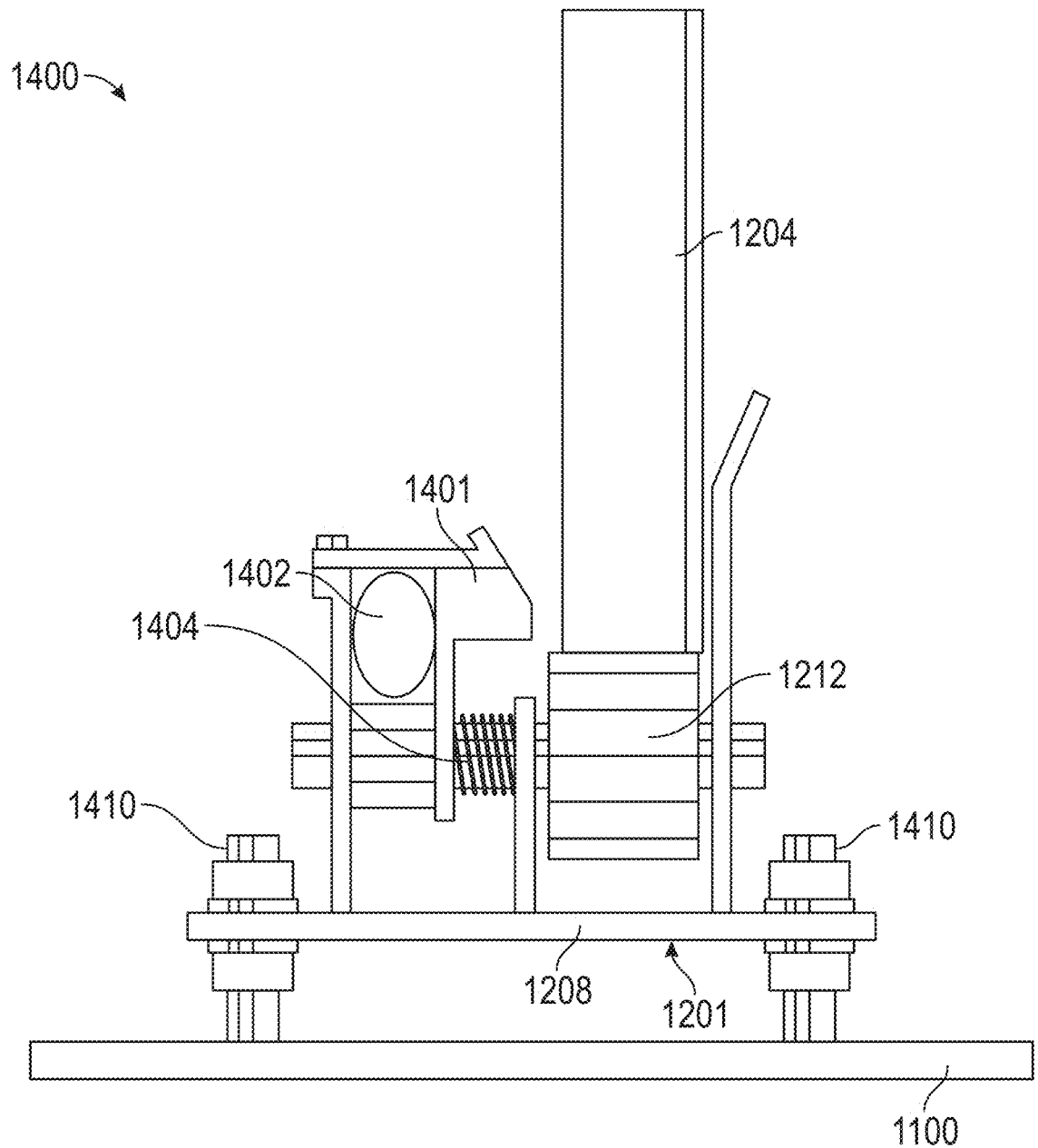
FIG. 14 illustrates a panel aligner of the jig of FIG. 12.

Turning ahead in the FIG. 14 the panel aligner 1400 of the jig 1200 (FIG. 12). The panel aligner 1400 is merely exemplary, and embodiments of the panel aligner are not limited to embodiments presented herein. The panel aligner can be employed in many different embodiments or examples not specifically depicted or described herein. In some embodiments, the panel aligner 1400 can be configured to rotationally align the solar panels 1204 with each other while the solar panels 1204 are in the track system 1201. In some embodiments, first track 1208 can be aligned with respect to base 1100 using leveling screws 1410.

In some embodiments, the panel aligner 1400 can include a guide 1401, a bladder 1402, and/or a biasing element 1404. In some embodiments, the solar panels 1204 can be operated along the automated conveyor 1212 until the solar panels 1204 are in a desired position. In some embodiments, when the solar panels 1204 are in the desired position, the bladder 1402 fills with a fluid (e.g., air, liquid, mechanical actuator, etc.) to cause the guide 1401 to abut and push the solar panels 1204, to rotationally align the solar panels 1204 with each other. For example, the bottom edges of the solar panels 1204 can be aligned with each other. In some embodiments, the solar panels 1204 can be affixed to the torque tube 1206 (FIG. 12) while the guide 1401 is abutting the solar panels 1204 to ensure proper alignment. In some embodiments, the bladder 1402 can release the fluid and the biasing element 1404 (e.g., a compression spring) biases the guide 1401 away from the solar panels 1204. In some embodiments, the solar panels 1204 can be affixed to the torque tube 1206 (FIG. 6) after the guide has retracted away from the solar panels 1204. In such embodiments, the solar panels 1204 can remain in a rotationally aligned position after being aligned by panel aligned 1400.

Figure 15:
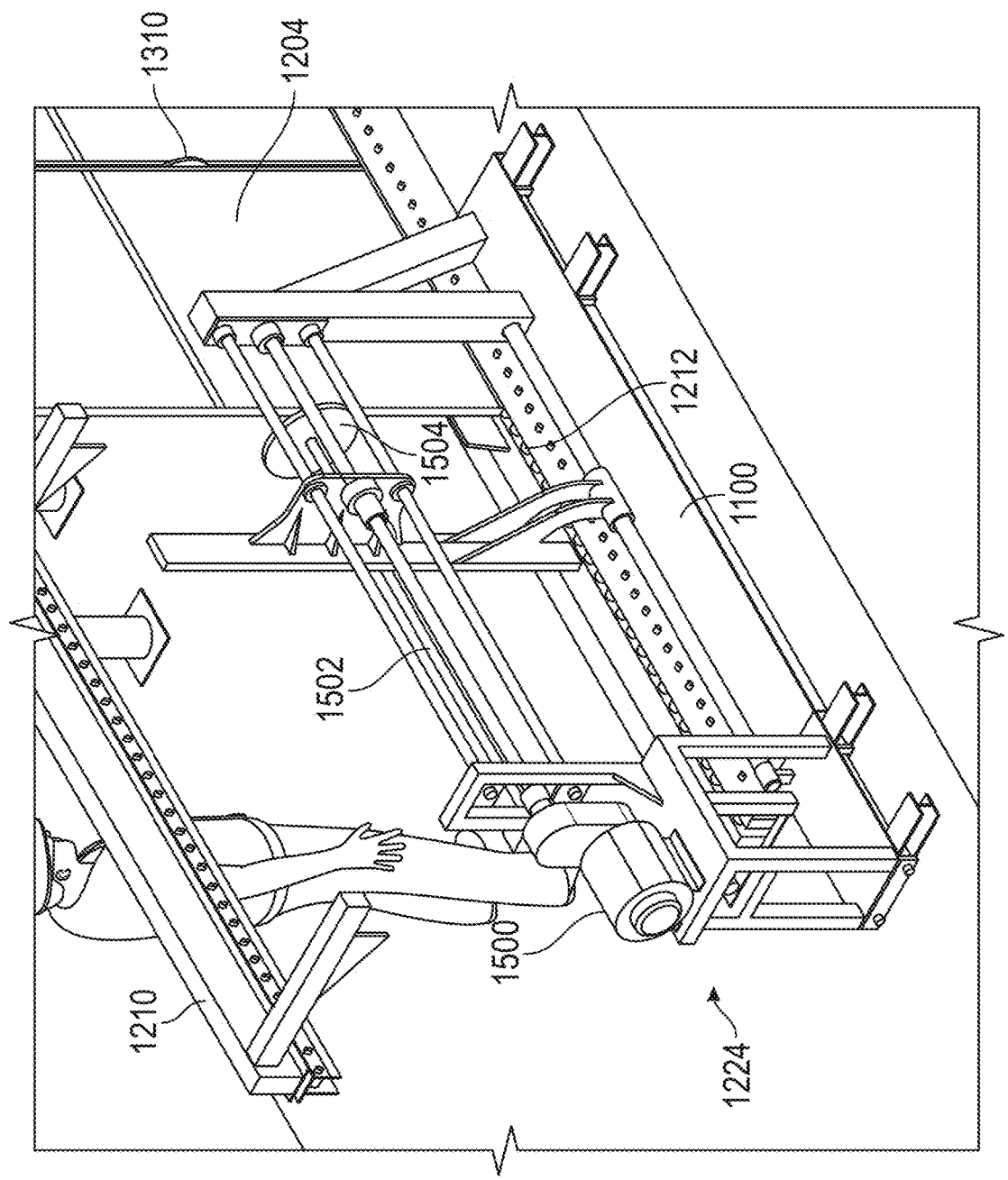
FIG. 15 illustrates a compressing actuator of the jig of FIG. 12.

Turning ahead in the drawings, FIG. 15 illustrates the compressing actuator 1224 of the jig 1200 (FIG. 12). The compressing actuator 1224 is merely exemplary, and embodiments of the compressing actuator are not limited to embodiments presented herein. The compressing actuator can be employed in many different embodiments or examples not specifically depicted or described herein. In some embodiments, the compressing actuator 1224 can be configured to narrow a respective spacing between each of the solar panels 1204 on the track system 1201.

In some embodiments, the compressing actuator 1224 can include a motor 1500, a lead screw 1502 coupled to the motor 1500, and an end guide 1504 coupled to the lead screw 1502. In some embodiments, the motor 1500 is configured to operate the lead screw 1502 to extend the end guide 1504 to abut an end of one of the solar panels 1204 and move the solar panels 1204 along a direction of a longitudinal length of the lead screw 1502 to narrow the respective spacing between each of the solar panels 1204 on the track system 1201. In some embodiments, the motor 1500 extends the end guide 1504 to narrow the spacing between the solar panels until each side of a respective spacer 1310 is abutting a solar panel 1204 (as illustrated in FIG. 15). In some embodiments, the motor 1500 operates the end guide 1504 until the solar panels 1204 are aligned based on a solar panel assembly specification. For example, a spacing between each of the solar panels 1204 can be narrowed from approximately 1½ inch (3.81 cm) to approximately ⅜ inch (0.95 cm), or another suitable spacing. In some embodiments, the compressing actuator 1224 may not have the motor 1500. In such an embodiment, an operator can physically maneuver the end guide 1504 until the solar panels 1204 are aligned based on a solar panel assembly specification.

Figure 16:
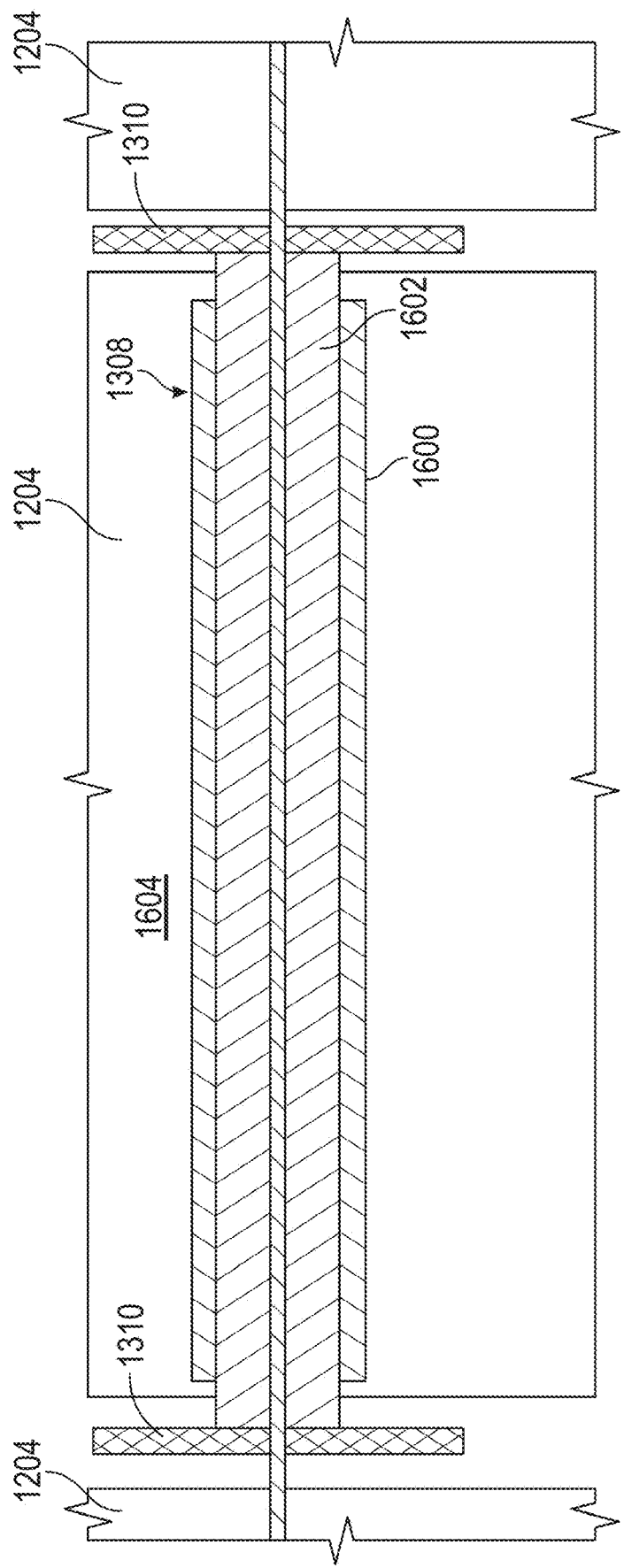
FIG. 16 illustrates a lengthwise cross-section of the spacer rod of FIG. 13.

Turning ahead in the drawings, FIG. 16 illustrates a lengthwise cross-section of the spacer rod 1308. In some embodiments, the spacer rod 1308 can include a rigid sleeve 1600 and a compression spring 1602 positioned along the spacer rod 1308 in between each of the spacers 1310. In some embodiments, the rigid sleeves 1600 are sized to be less than a width of each of the solar panels 1204 (FIG. 12). In some embodiments, the compression springs 1602 are sized to be more than a width of each of the solar panels 1204 when the compression springs 1602 are uncompressed.

In some embodiments, a solar panel assembly configuration does not include a full set of solar panels (e.g., a space is open between respective spacers 1310). In such embodiments, the compressing actuator 1224 (FIGS. 12, 15) compresses the solar panels 1204 (FIG. 12), but in locations where a solar panel 1204 (FIG. 12) is not positioned in between respective spacers 1310, the compression springs 1602 are compressed and the rigid sleeves 1600 engage the spacers 1310 in a manner similar to a solar panel 1204 (FIG. 12), thus forming a space between the solar panels 1204 (FIG. 12) the total thickness of two of the spacers 1310 and the rigid sleeve 1600. The rigid sleeves 1600 can thus mitigate the spacers 1310 from engaging and reduce the time associated with assembling a solar panel assembly as the compressing actuator 1224 (FIG. 12, 15) does not compress an entire length of a solar panel 1204 (FIG. 12). That is, the rigid sleeves 1600 can reduce the distance the compressing actuator 1224 (FIGS. 12, 15) operates to narrow the space between solar panels 1204 (FIG. 12). In some embodiments, the compression springs 1602 can bias the spacers 1310 outward beyond a width of the solar panels 1204 (FIG. 12) so that the solar panels 1204 can be readily inserted in a respective space 1604 to be aligned for coupling with the torque tube 1206 (FIG. 12). In some embodiments, the rigid sleeves 11200 can be configured to be installed and/or removed on the spacer rod 1308 without removing the spacers 1310 from the spacer rod 1308, In some embodiments, various different size of rigid sleeves 11200 can be used, such as to provide various different spaces between solar panels 1204 (FIG. 12) when there is no solar panel used between a pair of the spacers 1310.

Returning to FIG. 12, in some embodiments, the first assembly station 526 can include a conveyor track 1228 that is parallel to the track system 1201 and includes a load balancer 1230 and a retaining tool 1232. In some embodiments, the conveyor track 1228 can be utilized to maneuver solar panels 1204 along a length of the track system 1201 and/or move solar panel assemblies from the first assembly station 526 to the cassette. In some embodiments, the first assembly station 526 can include a second monorail 1234 that is perpendicular to the track system 1201 and is configured to move the respective torque tubes 1206 from the torque tube load rack 1114 to the torque tube support structure 1202. In some embodiments, the second monorail includes a load balancer 1236 and a retention tool 1238.

In some embodiments, the second assembly station 528 (FIG. 5A) can be similar or identical to the first assembly station 526, and various elements of the second assembly station 528 (FIG. 5A) can be similar or identical to various elements of the first assembly station 526. In some embodiments, the second assembly station 528 (FIG. 5A) can operates in a similar manner or identical to the first assembly station 526. In some embodiments, the assembly stations 526, 528 can assemble solar panel assemblies concurrently by receiving torque tubes from a torque tube sorting area. The assembly stations 526, 528 each affix the solar panels to the torque tube to form the solar panel assembly. In some embodiments, the wire harness is affixed after the solar panel assembly is transferred to the cassette, while the next solar panel assembly to be loaded on the cassette is being assembled at the assembly station (e.g., 526, 528), FIG. 17 illustrates a perspective view of a strip station 1700, which can be included in another embodiment of the mobile solar panel assembly facility 500 (FIG. 5A). In the illustrated embodiment of FIG. 12, the pallet stripping area 564 of solar panel assembly facility includes the strip station 1700. The strip station 1700 can include a conveyor platform 1702, a lift 1704, a rotating drum 1706, and/or conveyors 1708.

During operation, solar panel packages 570 are unloaded from a vehicle at the loading area and positioned on the pallet conveyor. The pallet conveyor operates to move the solar panel packages 570 toward the pallet stripping area 564. At the pallet stripping area 564, the solar panel packages 570 are unpacked and the waste is unloaded at the waste station. However, the solar panel packages 570 may have been unloaded from the vehicle in an orientation that is different from how they are to be loaded at the accumulation area (e.g., 566 (FIG. 5)). The strip station 1700 can move and rotate the solar panels 574 so that the solar panels are in a proper orientation for the accumulation area, thereby reducing labor and increasing efficiency at the mobile solar panel assembly facility 500. The solar panels 574 are loaded onto the conveyor platform 1702 and the lift 1704 lifts the conveyor platform 1702 to a height that aligns the solar panels 574 with the conveyors 1708. The conveyors 1708 are positioned on a top, bottom, left and right side of the inside of the rotating drum 1706 to prevent or limit movement of the solar panels 574. The conveyors 1708 receive the solar panels 574 from the conveyor platform 1702. Based on the specific orientation expected for a solar panel assembly, the rotating drum 1706 will rotate a certain number of degrees to ensure the solar panels 574 are in the proper orientation. In many embodiments, the solar panels 574 can be loaded into the rotating drum 1706 as a set of solar panels, such as all of the solar panels included in one package of solar panels.

Figure 18:
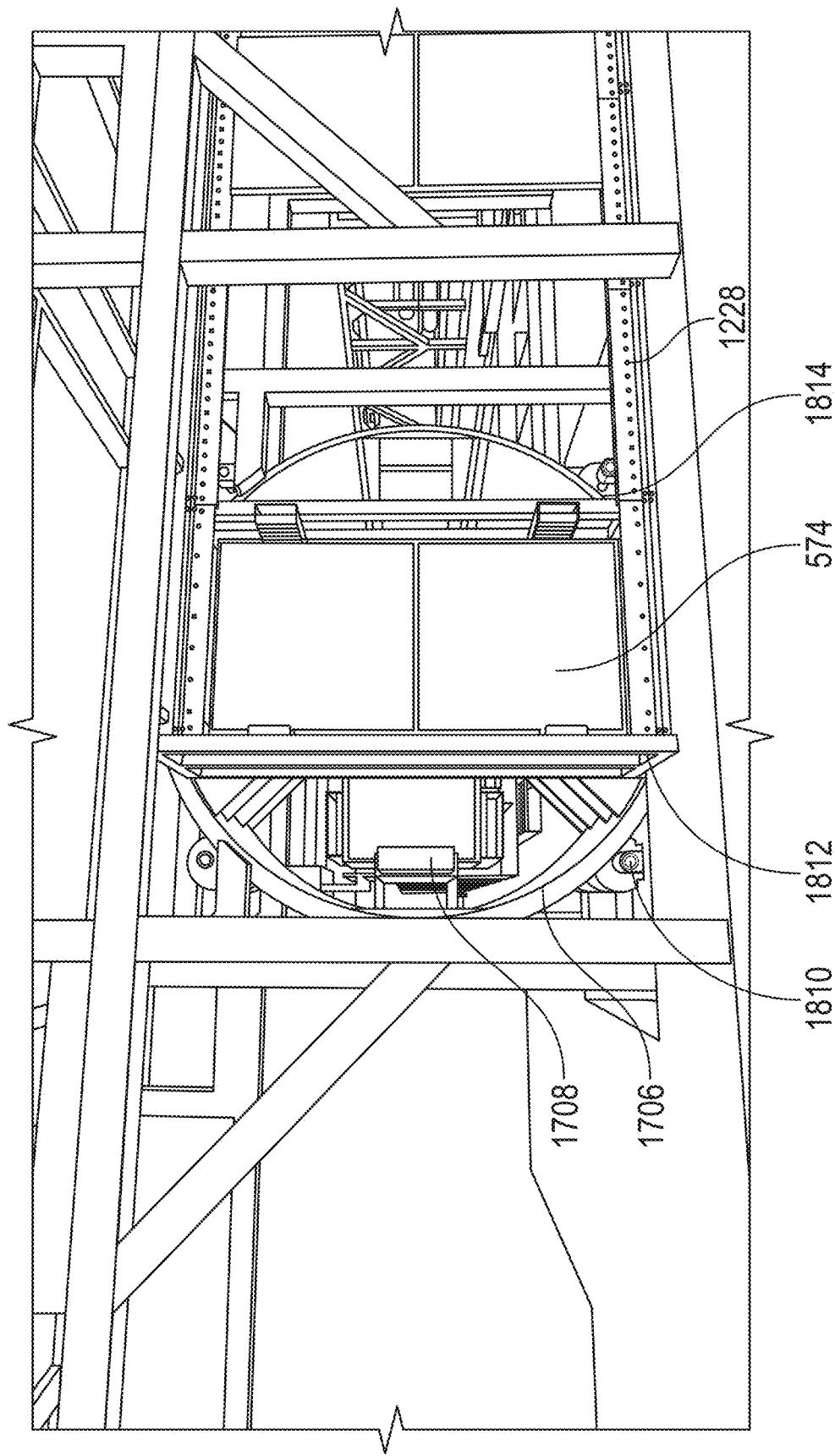
FIG. 18 illustrates a side view of the rotating drum of FIG. 17.
Figure 19:
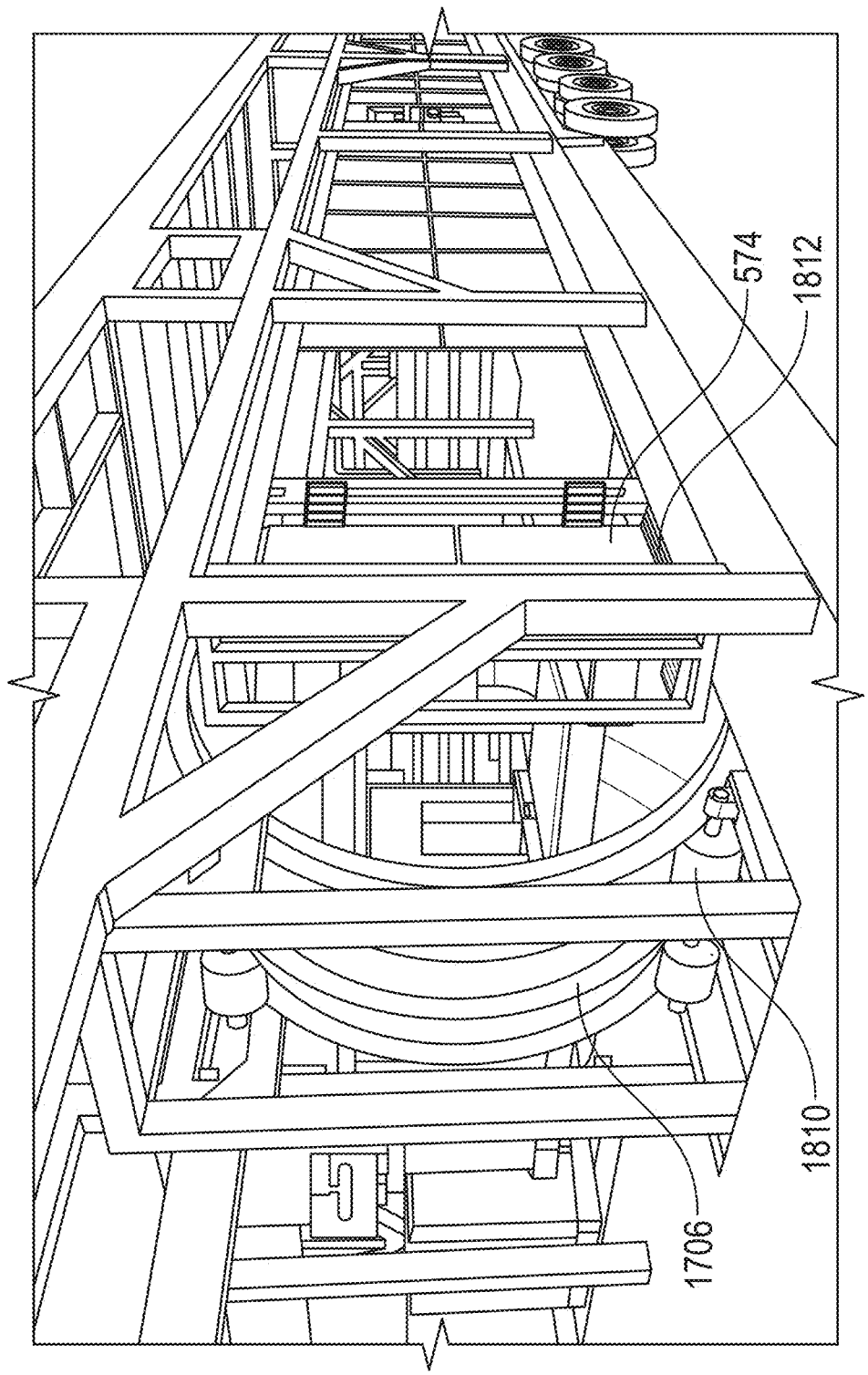
FIG. 19 illustrates a perspective view of the rotating drum and de-stacker of FIG. 17.
Figure 20:
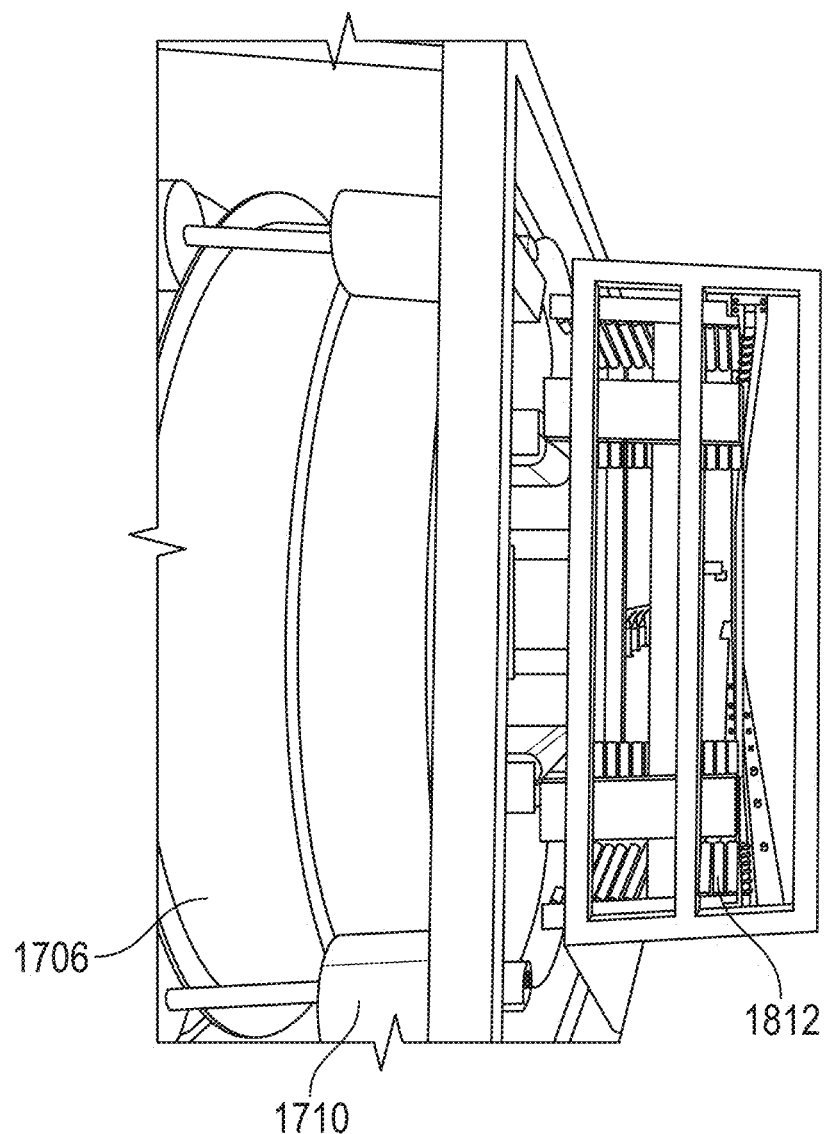
FIG. 20 illustrates an end view of the rotating drum and de-stacker of FIG. 17.

Turning to FIG. 18, a side view of the rotating drum 1706 is illustrated. FIG. 19 illustrates a perspective view of the rotating drum 1706 and a de-stacker 1812. FIG. 20 illustrates an end view of the rotating drum and the de-stacker 1812. As shown in FIG. 18, the rotating drum 1706 can include motors 1810 that operate to rotate the rotating drum 1706 based on the desired specifications of a solar panel assembly. As shown in FIGS. 18-19, the solar panels 574 that were loaded in the rotating drum 1706 FIG. 17 have been rotated 90 degrees to an upright position so that they can be unloaded with the de-stacker 1812, which can include rolling rods 1814 to allow the solar panels 574 to be transferred onto the conveyor track 1228 (e.g., which can be similar or identical to conveyor 578 (FIG. 5) of the accumulation area 566 (FIG. 5)). The de-stacker 1812 can move the solar panels 574 into the accumulation area to be fed toward the first assembly station 526 (FIG. 5A), where the solar panels can be aligned and coupled together (discussed in more detail above) on a torque tube, after which the solar panel assembly is loaded onto a cassette and transferred to an installation site. In some embodiments, the solar panels 574 moved from the de-stacker 1812 to the accumulation area 566 (FIG. 5) to maintain the conveyor track 1228 at full capacity with solar panels. For example, each solar panel from the solar panels 574 is loaded individually onto the conveyor track 1228 from the de-stacker 1812. The conveyor track 1228 can move the solar panels along to the first assembly station 526 (FIGS. 5A-5B), and additional solar panels 574 can be fed into the conveyor track 1228 from the de-stacker 1812 to fill the space of the solar panels 574 that have been positioned in first assembly station 526.

Figure 21:
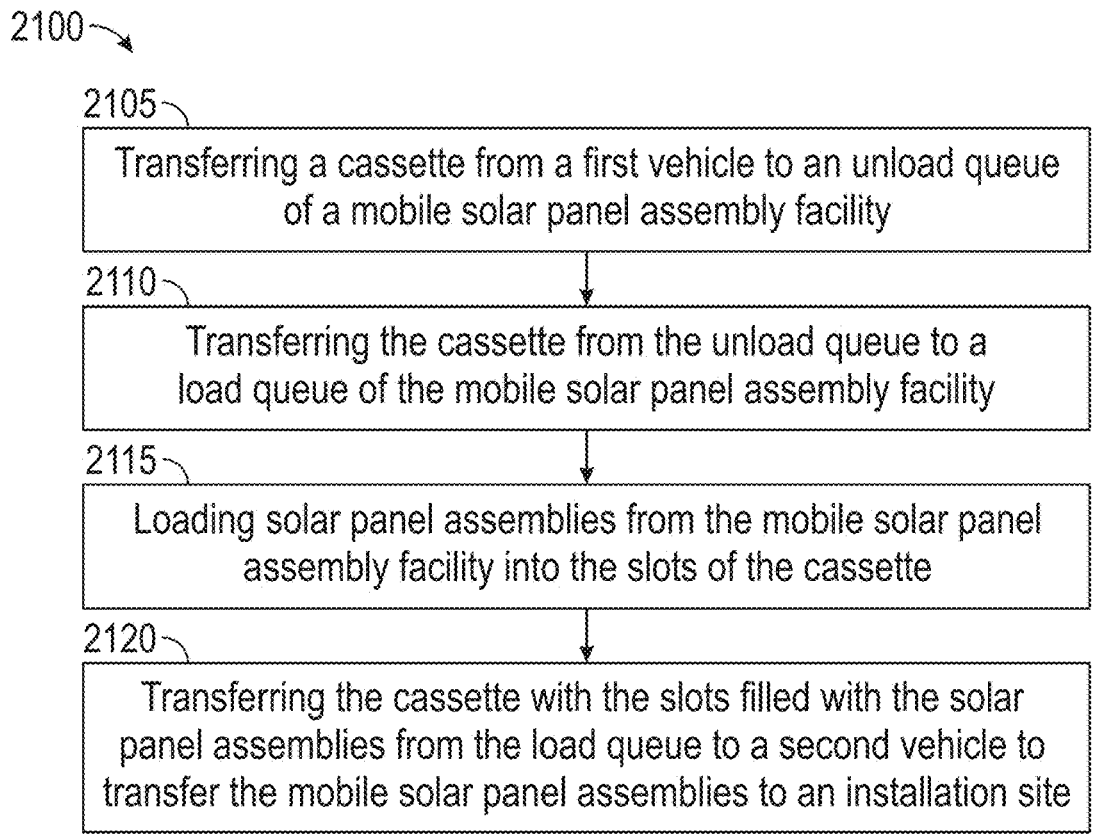
FIG. 21 illustrates a method of loading solar panel assemblies on a cassette, according to another embodiment.

Turning to FIG. 21, FIG. 21 illustrates a method 2100 of loading a cassette, according to another embodiment. Method 2100 is merely exemplary and is not limited to the embodiments presented herein. Method 2100 can be employed in many different embodiments or examples not specifically depicted or described herein. In some embodiments, the procedures, the processes, and/or the activities of method 2100 can be performed in the order presented. In other embodiments, the procedures, the processes, and/or the activities of method 2100 can be performed in any suitable order. In still other embodiments, one or more of the procedures, the processes, and/or the activities of method 2100 can be combined or skipped.

The embodiments disclosed herein can advantageously allow for rapid loading of solar panel assemblies on a cassette for loading onto a vehicle, so the vehicle can readily install the solar panel assemblies at an installation site. By pre-loading solar panel assemblies, the solar panel assemblies can be rapidly installed once at the installation site. In some embodiments, method 2100 can include an activity 2105 of transferring a cassette from a first vehicle to an unload queue of a mobile solar panel assembly facility. The cassette comprises slots configured to hold solar panel assembles, and the slots of the cassette are empty when the cassette is transferred to the unload queue. In some embodiments, method 2100 can include an activity 2110 of transferring the cassette from the unload queue to a load queue of the mobile solar panel assembly facility. In some embodiments, method 2100 can include an activity 2115 of loading solar panel assemblies from the mobile solar panel assembly facility into the slots of the cassette while the cassette is in a fill position of the load queue. In some embodiments, method 2100 can include an activity 2120 of transferring the cassette with the slots filled with the solar panel assemblies from the load queue to a second vehicle to transfer the mobile solar panel assemblies to an installation site.

Figure 22:
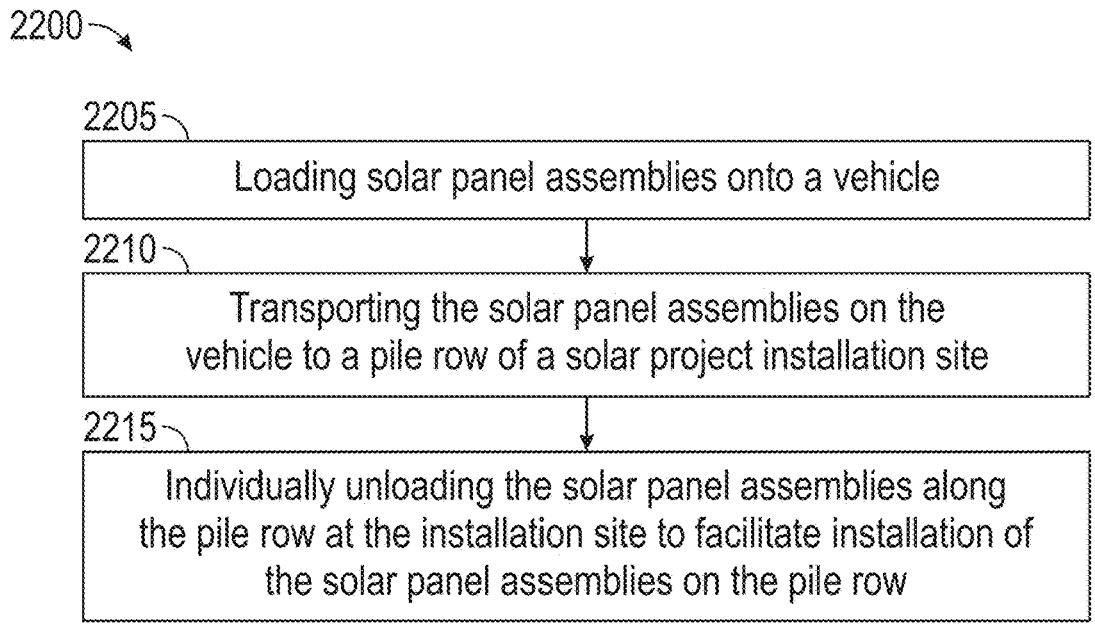
FIG. 22 illustrates a method of installing solar panel assemblies, according to another embodiment.

Turning to FIG. 22, FIG. 22 illustrates a method 2200 of installing solar panel assemblies, according to another embodiment. Method 2200 is merely exemplary and is not limited to the embodiments presented herein. Method 2200 can be employed in many different embodiments or examples not specifically depicted or described herein. In some embodiments, the procedures, the processes, and/or the activities of method 2200 can be performed in the order presented. In other embodiments, the procedures, the processes, and/or the activities of method 2200 can be performed in any suitable order. In still other embodiments, one or more of the procedures, the processes, and/or the activities of method 2200 can be combined or skipped.

The embodiments disclosed herein can advantageously allow for rapid loading and unloading of solar panel assemblies, so the vehicle can readily install the solar panel assemblies at an installation site. By pre-loading solar panel assemblies, the solar panel assemblies can be rapidly installed once at the installation site. In some embodiments, method 2200 can include an activity 2205 of loading solar panel assemblies onto a vehicle. In some embodiments, method 2200 can include an activity 2210 of transporting the solar panel assemblies on the vehicle to a pile row of a solar project installation site. In some embodiments, method 2200 can include an activity 2215 of individually unloading the solar panel assemblies along the pile row at the installation site to facilitate installation of the solar panel assemblies on the pile row.

Figure 23:
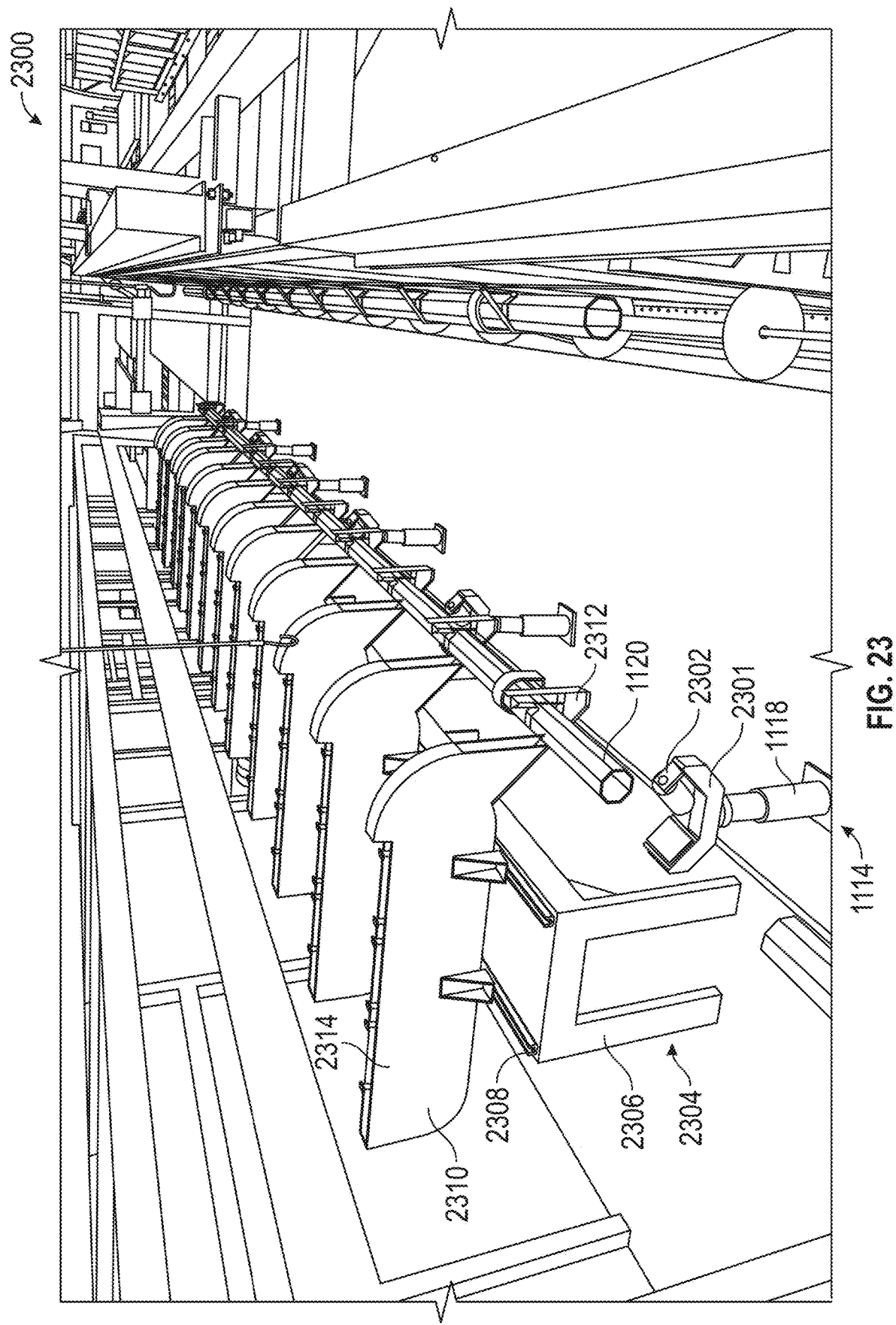
FIG. 23 illustrates a perspective view of an assembly station, according to another embodiment.

FIG. 23 illustrates a perspective view of an assembly station 2300, according to another embodiment. Assembly station 2300 can be similar to assembly station 526 (FIG. 5A), and various elements of assembly station 2300 can be similar or identical to various elements of assembly station 526 (FIG. 5A). The assembly station 526 can include the torque tube load rack 1114. In some embodiments, the torque tube load rack 1114 can include the hard stops 1116 (FIG. 11) or another linear positioner, and the stanchions 1118, which can be used to hold a torque tube (e.g., 1120). In the illustrated embodiment of FIG. 23, the stanchions 1118 are hydraulic stanchions, which can be adjusted to various different heights using a foot-activated actuator. In some embodiments, the stanchions 1118 are in a fixed position and are manually or automatically adjusted based on the specifications of a solar panel assembly. The stanchions 1118 can be configured to receive a torque tube 1120. The stanchions 118 include saddles 2301, and, the saddles 2301 include rollers 2302 to allow the rollers 2302 to allow the torque tube 1120 to readily move along the saddles 2301, which can involve sliding the torque tube within the brackets manually or automatically.

In the illustrated embodiment, a bracket loader system 2304 is positioned adjacent to the torque tube load rack 1114. The bracket loader system 2304 includes a platform 2306, rails 2308, and bracket loaders 2310 coupled to the rails 2308. The bracket loaders 2310 can be moved along the length of the rails based on the specifications of a particular solar panel assembly. The bracket loaders 2310 can include aligners 2312 that receive a bracket from the main body 2314 of the bracket loader 2310 to align the bracket with the saddle 2301 so that a torque tube 1120 can be slide along the saddles 2301, through the brackets held by the aligners 2312. For example, an alignment device can align ends of the various different torque tubes (e.g., 1120) at various different positions, as described above, and the torque tube can be moved along the torque tube load rack 1114 to the proper position. In some embodiments, a solar panel assembly specification can specify that a torque tube of a solar panel assembly intended for a certain installation position has a certain amount of overhang at the end of the solar panel assembly beyond the end of the solar panels in order to be coupled with a neighboring solar panel assembly. In various embodiments, the bracket loaders 2310 can be positioned along the rails 2308 relative to a saddle 2301 and position a bracket (e.g., bracket 1122 (FIG. 11)) in the aligner 2312 and the torque tube 1120 can be loaded into torque tube load rack 1114 and passed through the brackets 1122 (FIG. 11) in the aligners 2312. In some embodiments, brackets 1122 (FIG. 11) and bushings 1124 (FIG. 11) can be coupled to the torque tube 1120 based on the specifications of the particular solar panel assembly. In some embodiments, the brackets 1122 (FIG. 11) are positioned on the torque tube 1120 based on respective locations of corresponding solar panels, and the bushings 1124 (FIG. 11) are positioned on the torque tube 1120 based on respective locations of corresponding pile caps at an installation site. In some embodiments, the positions of the brackets and/or the bushings can be specified in the solar panel assembly specification or from as-built pile locations. In some embodiments, the brackets and/or bushings, as well as other mechanical or electrical hardware, can be installed on the solar panel assembly on either side of the solar panel. For example, an operator can install brackets on one side of the solar panel (e.g., a side with a torque tube) and install other hardware (e.g., mechanical, electrical) on the opposite side of the solar panel. In some embodiments, the brackets and other hardware (e.g., mechanical, electrical) can be coupled to the solar panels via an autonomous robot based on the specifications of the solar panel assembly.

Figure 24:
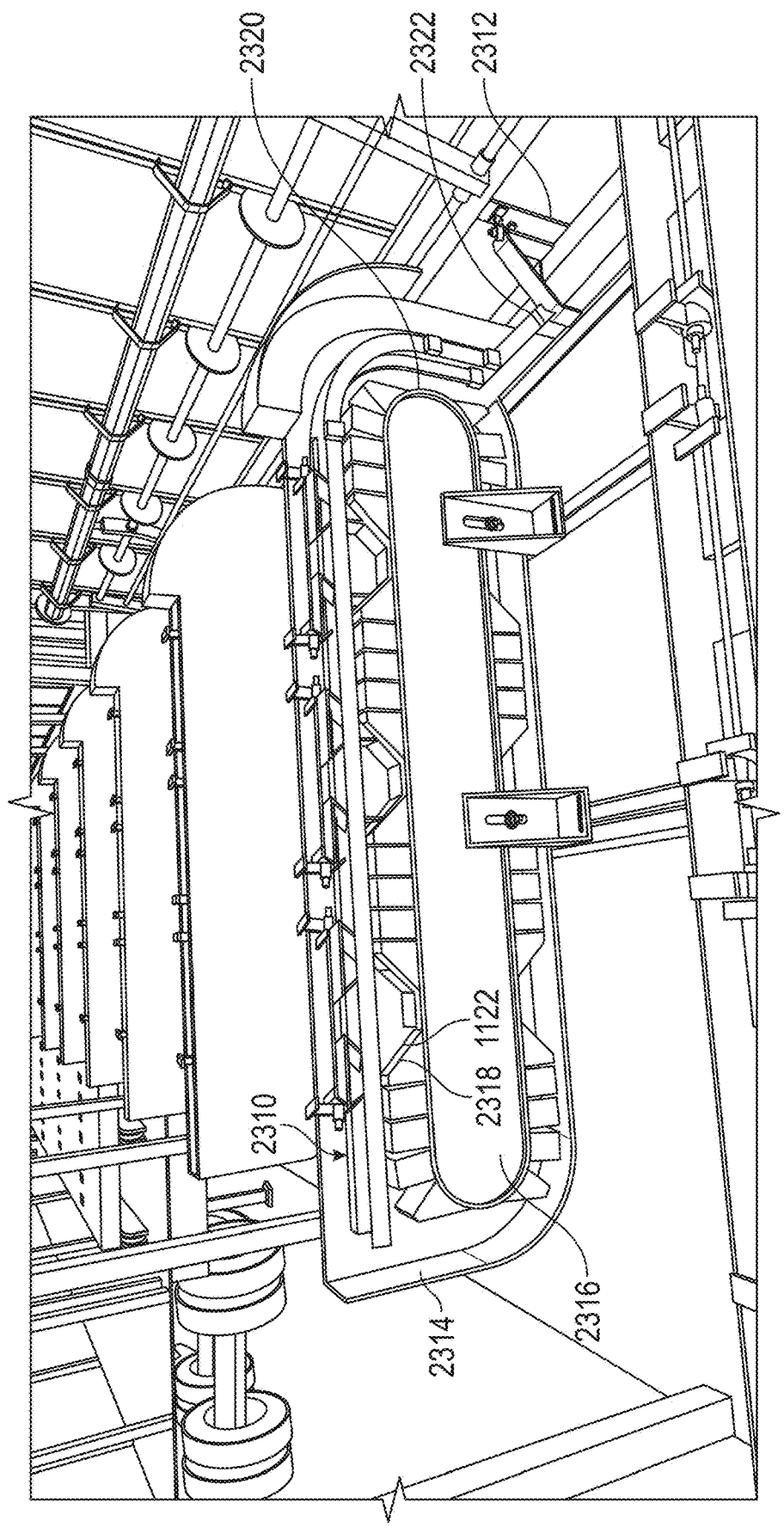
FIG. 24 illustrates an internal view of the automatic bracket loader of FIG. 23.

Turning to FIG. 24, an internal view of the bracket loader 2310. The main body 2314 of the bracket loader 2310 can include a bracket conveyor 2316 that includes portions 2318 to receive brackets 1122. During operation, the portions 2318 of the bracket conveyor 2316 are loaded with brackets 1122. Prior to a torque tube being loaded in the torque tube load rack 1114, the bracket loader 2310 moves along the rails 2308 to a specified position, the bracket conveyor 2316 operates to move the brackets 1122 toward the aligner 2312, and a bracket 1122 falls into position in the aligner 2312 when it reaches an end 2320 of the bracket loader 2310 and slides along a track 2322.

Figure 25:
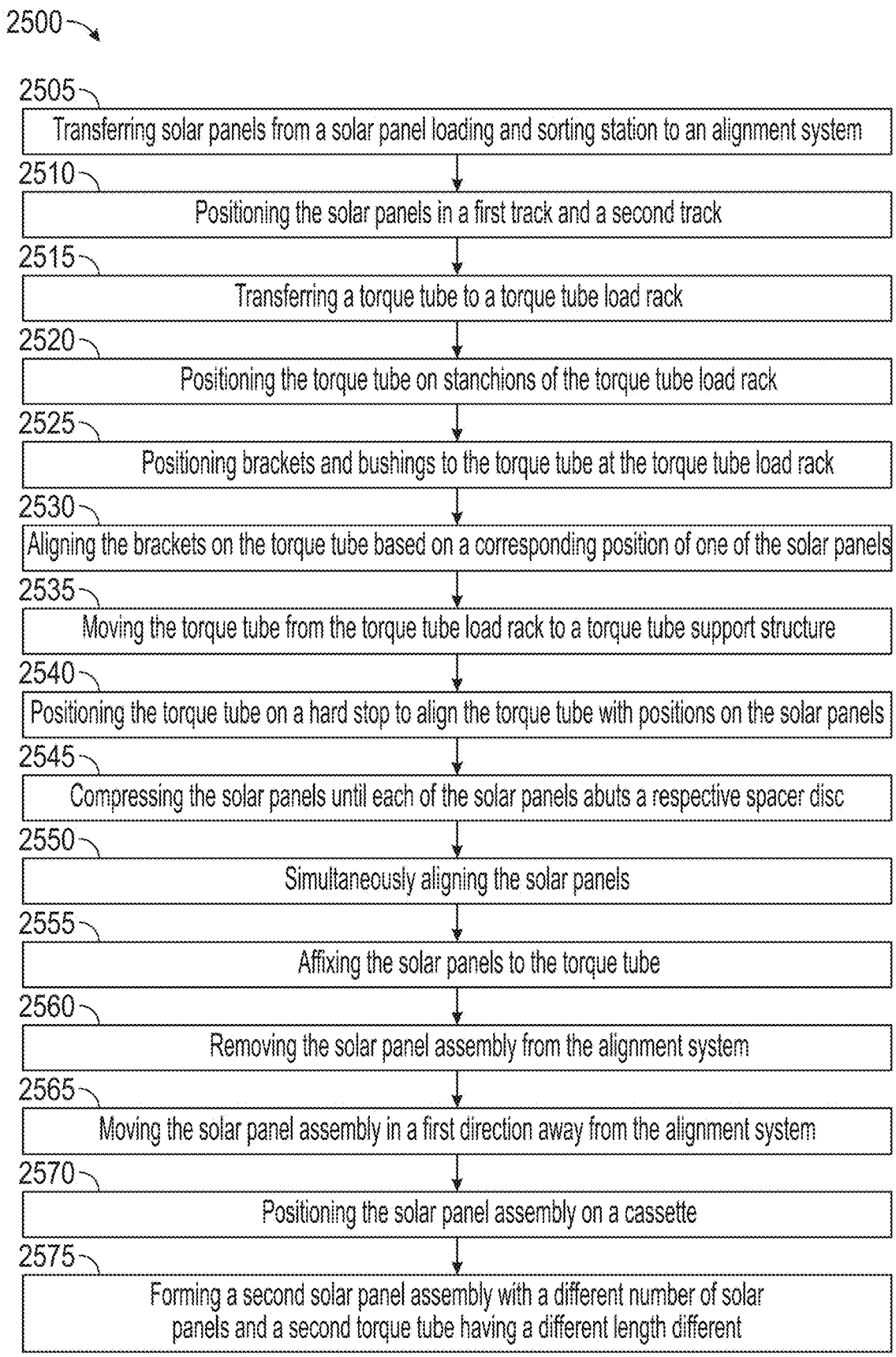
FIG. 25 illustrates a method of assembling a solar panel assembly, according to another embodiment.

FIG. 25 illustrates a method 2500 of assembling a solar panel assembly, according to another embodiment. Method 2500 is merely exemplary and is not limited to the embodiments presented herein. Method 2500 can be employed in many different embodiments or examples not specifically depicted or described herein. In some embodiments, the procedures, the processes, and/or the activities of method 2500 can be performed in the order presented. In other embodiments, the procedures, the processes, and/or the activities of method 2500 can be performed in any suitable order. In still other embodiments, one or more of the procedures, the processes, and/or the activities of method 2500 can be combined or skipped. In many embodiments, method 2500 can be performed using a jig (e.g., 1200 (FIG. 12)) and/or a mobile solar panel assembly facility (e.g., 500 (FIG. 5A)).

In some embodiments, method 2500 of assembling a solar panel assembly can include an activity 2505 of transferring respective solar panels (e.g., 574 (FIG. 5A), 1204 (FIG. 12)) from a solar panel loading and sorting station (e.g., 560, 580 (FIG. 5A)) to an alignment system, such as track system (e.g., 1201 (FIG. 12)) of a mobile solar panel assembly facility (e.g., 500 (FIG. 5A)). In some embodiments, when transferring the respective solar panels to the alignment system (e.g., track system), the method further can include an activity 2510 of positioning the respective solar panels in a first track (e.g., 1208 (FIG. 12)) and a second track (e.g., 1210 (FIG. 12)).

In some embodiments, the method can include an activity 2515 of transferring a respective torque tube from a torque tube queue or sorting area of the mobile solar panel assembly facility to a torque tube load rack (e.g., 1114 (FIG. 11)). In some embodiments, when transferring the respective torque tube or sorting area to the torque tube assembly station the method further can include an activity 2520 of positioning the respective torque tube on respective stanchions of the torque tube load rack.

In some embodiments, the method can include an activity 2525 of positioning brackets and/or bushings to the torque tube at the torque tube load rack. In some embodiments, when positioning or coupling brackets to the torque tube at the torque tube assembly station, the method further can include an activity 2530 of aligning the brackets on the torque tube based on a corresponding position of one of the respective solar panels. In some embodiments, the method can include an activity 2535 of moving the torque tube from the torque tube load rack to a torque tube support structure (e.g., 1202 (FIG. 12)). In some embodiments, the method can include an activity 2540 of positioning the torque tube on a hard stop to align the torque tube with a respective position on the respective solar panels.

In some embodiments, the method further can include an activity 2545 of compressing the respective solar panels until each of the respective solar panels abuts a respective spacer disc (e.g., 1310 (FIG. 13)), which can involve narrowing a respective gap between each of the solar panels. In some embodiments, the method can include an activity 2550 of simultaneously aligning the respective solar panels at the alignment system (e.g., track system).

In some embodiments, the method can include an activity 2555 of affixing the respective solar panels to the torque tube on the torque tube support station via the brackets to form a solar panel assembly. In some embodiments, the method can include an activity 2560 of removing the solar panel assembly from the alignment system (e.g., track system). In some embodiments, when removing the solar panel assembly from the alignment system (e.g., track system), the method can include an activity 2565 of moving the solar panel assembly in a first direction away from the alignment system (e.g., track system), and lifting the solar panel assembly via a work tool. In some embodiments, the method can include an activity 2570 of positioning the solar panel assembly on a cassette. In some embodiments, the solar panel assembly is a first solar panel assembly having a first number of solar panels and a first torque tube having a first length, and the method can include an activity 2575 of forming a second solar panel assembly with a second number of solar panels different than the first number of solar panels and a second torque tube having a second length different than the first length.

The embodiments disclosed herein can advantageously allow for controlled installation of prefabricated solar panel assemblies of solar panels, trackers (torque tubes), and wire-harnesses, which are then placed with monorail load balancers onto a previously installed row of piles. These techniques eliminate the logistics of site-wide material pre-staging and multiple visits to every location by successive teams of craftsmen, quality control, and supervision. The operational methodology can involve the solar panel assembly installation vehicle picking up a full populated cassette from the mobile solar panel assembly facility 500 (FIG. 5A), then transporting the full cassette to the row of empty piles intending to receive completed assemblies. The assemblies are installed on the pile caps, aligned, torqued in place, with final inspection buyoff obtained before the solar panel assembly installation vehicle moves to next successive position. This process can thus create fully inspected and consistent quality assemblies successively until the solar panel assembly installation vehicle returns to the mobile solar panel assembly facility for material reload.

The embodiments disclosed herein can advantageously allow for controlled installation of prefabricated solar panel assemblies of solar panels, trackers (torque tubes), and wire-harnesses, which are then placed with monorail load balancers onto a previously installed row of piles. These techniques eliminate the logistics of site-wide material pre-staging and multiple visits to every location by successive teams of craftsmen, quality control, and supervision. The operational methodology can involve the solar panel assembly installation vehicle 600 (FIG. 6) picking up a full populated cassette from the mobile solar panel assembly facility 500 (FIGS. 5A-5G), then transporting the full cassette to the row of empty piles intending to receive completed assemblies. The assemblies are installed on the pile caps, aligned, torqued in place, with final inspection buyoff obtained before the solar panel assembly installation vehicle 600 (FIG. 6) moves to next successive position. This process can thus create fully inspected and consistent quality assemblies successively until the solar panel assembly installation vehicle 600 (FIG. 6) returns to the mobile solar panel assembly facility 500 (FIGS. 5A-5G) for material reload.

Concurrently, while the vehicle is in transit and engaged in placing solar panel assemblies, other cassettes are populated with new assemblies for the next successive rows to be built. Serial activities are minimized improving cycle time by using multiple vehicles and maintaining production at a rate sufficient to keep cassettes populated and ready to move to vehicles when they return and dispense with an empty cassette. Overall, embodiments disclosed herein maintain assembly fabrication in one location and use vehicles and methods to install the assemblies at a rapid pace while maintaining verifiable installation quality.

In some embodiments, the techniques described herein can beneficially reduce the amount of time used to install a solar project over multiple square miles by significant decreasing the time involved to install the solar panels in the solar project, while also significantly reducing the number of workers involved in the installation project. Meanwhile, the quality of installation provided by the techniques described herein is superior to that of conventional techniques.

It should be recognized that numerous variations can be made to the above-described systems and methods without departing from the scope of the invention.

While various novel features of the invention have been shown, described, and pointed out as applied to particular embodiments thereof, it should be understood that various omissions, substitutions and changes in the form and details of the systems and methods described and illustrated may be made by those skilled in the art without departing from the spirit of the invention. Amongst other things, the steps shown in the methods may be carried out in different orders in many cases, where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components are for illustrative purposes to facilitate a full and complete understanding and appreciation of the various aspects and functionality of particular embodiments of the invention, as realized in system and method embodiments thereof. Those skilled in the art will appreciate that the invention can be practiced in other than the described embodiments, which are presented for purposes of illustration and not limitation. For example, to one of ordinary skill in the art, it will be readily apparent that any element of FIGS. 1-25 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus comprising:
    a base; and
    stanchion rows configured to hold solar panel assemblies, wherein each one of the stanchion rows is configured to hold a torque tube of a respective solar panel assembly of the solar panel assemblies, and the each one of the stanchion rows comprises respective stanchions,
    wherein the stanchion rows are configured to hold the solar panel assemblies when lengths of torque tubes of the solar panel assemblies are different and when the lengths of the torque tubes are the same.

2. The apparatus of claim 1, wherein each of the respective stanchions of the each one of the stanchion rows comprises a respective saddle configured to receive the torque tube of the respective solar panel assembly held by the each one of the stanchion rows.

3. The apparatus of claim 2, wherein:
    the each of the respective stanchions comprises a respective tube and a respective rod positioned in the respective tube; and
    the respective saddle of the each of the respective stanchions is coupled to the respective rod.

4. The apparatus of claim 3, wherein the respective saddle is positioned external to the respective tube.

5. The apparatus of claim 3, wherein the respective rod is coupled to an actuator on the base.

6. The apparatus of claim 5, wherein the actuator operates the respective rod to extend the respective saddle away from respective tube.

7. An apparatus comprising:
    a base; and
    stanchion rows configured to hold solar panel assemblies, wherein each one of the stanchion rows is configured to hold a torque tube of a respective solar panel assembly of the solar panel assemblies, and the each one of the stanchion rows comprises respective stanchions,
    wherein:
        each of the respective stanchions of the each one of the stanchion rows comprises a respective saddle configured to receive the torque tube of the respective solar panel assembly held by the each one of the stanchion rows;
        the base comprises one or more respective recesses corresponding to the each one of the stanchion rows; and
        the one or more respective recesses are configured to receive a portion of one or more solar panels of the respective solar panel assembly held by the each one of the stanchion rows when the torque tube of the respective solar panel assembly is positioned in the respective saddles of the respective stanchions of the each one of the stanchion rows.

8. The apparatus of claim 1, wherein the base comprises one or more apertures configured to receive one or more tools or conveyors of a work vehicle.

9. The apparatus of claim 1, wherein the base comprises a first set of wheels and a second set of wheels.

10. The apparatus of claim 9, wherein:
    the first set of wheels is positioned in a first direction; and
    the second set of wheels is positioned in a second direction different from the first direction.

11. The apparatus of claim 9, wherein:
    the base comprises drive motors configured to drive the first and second sets of wheels; and
    the base comprises a battery configured to power the drive motors.

12. The apparatus of claim 1, wherein a quantity of the respective stanchions of the each one of the stanchion rows is at least three.

13. The apparatus of claim 1, wherein one or more of the respective stanchions of the each one of the stanchion rows are configured to rotate between an upright position and a lowered position.

14. Apparatus comprising:
    a base; and
    stanchion rows configured to hold solar panel assemblies, wherein each one of the stanchion rows is configured to hold a torque tube of a respective solar panel assembly of the solar panel assemblies, and the each one of the stanchion rows comprises respective stanchions,
    wherein:
        one or more of the respective stanchions of the each one of the stanchion rows are configured to rotate between an upright position and a lowered position; and
        the one or more of the respective stanchions are spring-biased in the upright position.

15. The apparatus of claim 1, wherein a quantity of the stanchion rows is at least six.

16. The apparatus of claim 1, wherein the solar panel assemblies held by the stanchion rows are configured to extend across a full block row of a solar project.

17. The apparatus of claim 1, wherein the solar panel assemblies configured to be held by the stanchion rows collectively comprise up to approximately 144 solar panels.

18. A method comprising:
    transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
    transferring the cassette from the unload queue to a load queue of the mobile solar panel assembly facility;
    while the cassette is in a fill position of the load queue, loading solar panel assemblies from the mobile solar panel assembly facility into the slots of the cassette;
    transferring the cassette with the slots filled with the solar panel assemblies from the load queue to a second vehicle to transfer the solar panel assemblies to an installation site; and
    removing the solar panel assemblies from the cassette when the second vehicle arrives at the installation site, comprising individually lifting each respective one of the solar panel assemblies and transferring the each respective one of the solar panel assemblies in a first widthwise direction to a position above a respective installation position along a pile row of the installation site.

19. A method comprising:
transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
transferring the cassette from the unload queue to a load queue of the mobile solar panel assembly facility;
while the cassette is in a fill position of the load queue, loading solar panel assemblies from the mobile solar panel assembly facility into the slots of the cassette; and
transferring the cassette with the slots filled with the solar panel assemblies from the load queue to a second vehicle to transfer the solar panel assemblies to an installation site,
wherein loading the solar panel assemblies into the slots of the cassette further comprises, for each one of the solar panel assemblies, coupling a respective wire harness to the each one of the solar panel assemblies.

20. A method comprising;
transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
transferring the cassette from the unload queue to a load queue of the mobile solar panel assembly facility;
while the cassette is in a fill position of the load queue, loading solar panel assemblies from the mobile solar panel assembly facility into the slots of the cassette; and
transferring the cassette with the slots filled with the solar panel assemblies from the load queue to a second vehicle to transfer the solar panel assemblies to an installation site,
wherein loading the solar panel assemblies into the slots of the cassette further comprises, for each one of the solar panel assemblies, indexing a position of the cassette to align a respective next empty one of the slots with an assembling position of the mobile solar panel assembly facility to facilitate loading of the each one of the solar panel assemblies from the assembling position into the respective next empty one of the slots.

21. The method of claim 20, wherein loading the solar panel assemblies into the slots of the cassette further comprises, for the each one of the solar panel assemblies, raising respective stanchions at the respective next empty one of the slots to hold the each one of the solar panel assemblies.

22. A method comprising:
transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
transferring the cassette from the unload queue to a load queue of the mobile solar panel assembly facility;
while the cassette is in a fill position of the load queue, loading solar panel assemblies from the mobile solar panel assembly facility into the slots of the cassette; and
transferring the cassette with the slots filled with the solar panel assemblies from the load queue to a second vehicle to transfer the solar panel assemblies to an installation site,
wherein:
the unload queue comprises an unload conveyor configured to move the cassette within the unload queue;
the load queue comprises a load conveyor configured to move the cassette within the load queue; and
transferring the cassette from the unload queue to the load queue comprises using a transfer conveyor to move the cassette.

23. A method comprising:
transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
transferring the cassette from the unload queue to a load queue of the mobile solar panel assembly facility;
while the cassette is in a fill position of the load queue, loading solar panel assemblies from the mobile solar panel assembly facility into the slots of the cassette; and
transferring the cassette with the slots filled with the solar panel assemblies from the load queue to a second vehicle to transfer the solar panel assemblies to an installation site,
wherein the cassette comprises drive motors configured to transfer the cassette from the first vehicle to the unload queue, from the unload queue to the load queue, and from the load queue to the second vehicle.

24. A method comprising:
transferring a cassette from a first vehicle to an unload queue of a mobile solar panel assembly facility, wherein the cassette comprises slots configured to hold solar panel assemblies, and the slots of the cassette are empty when the cassette is transferred to the unload queue;
transferring the cassette from the unload queue to a load queue of the mobile solar panel assembly facility;
while the cassette is in a fill position of the load queue, loading solar panel assemblies from the mobile solar panel assembly facility into the slots of the cassette; and
transferring the cassette with the slots filled with the solar panel assemblies from the load queue to a second vehicle to transfer the solar panel assemblies to an installation site,
wherein:
the cassette moves in a first widthwise direction within the unload queue;
the cassette moves in a second widthwise direction with the load queue;
the second widthwise direction is opposite the first widthwise direction; and
the cassette moves in a lengthwise direction when being transferred from the unload queue to the load queue.

25. The method of claim 18, wherein the first vehicle is different from the second vehicle.

26. The method of claim 18, further comprising lowering the each respective one of the solar panel assemblies onto respective pile caps at the respective installation position.

27. The method of claim 26, further comprising installing a coupler on a first torque tube of a first one of the solar panel assemblies to couple a second torque tube of a second one of the solar panel assemblies to the first torque tube.

28. The method of claim 27, further comprising moving the second one of the solar panel assemblies in a lengthwise direction toward the first one of the solar panel assemblies to position the second torque tube within the coupler and couple the second torque tube to the first torque tube.

29. The method of claim 18, further comprising driving the second vehicle forward to a respective subsequent one of the respective installation positions along the pile row between removing each respective one of the solar panel assemblies.

30. The method of claim 18, further comprising moving the cassette on the second vehicle in a second widthwise direction opposite the first widthwise direction to facilitate removing the solar panel assemblies from the cassette.

31. The method of claim 18, wherein the solar panel assemblies are assembled at the mobile solar panel assembly facility.

32. The method of claim 18, wherein the solar panel assemblies loaded into the cassette are configured to extend across a full block row at the installation site.

* * * * *